(12) United States Patent
Abe et al.

(10) Patent No.: US 9,020,516 B2
(45) Date of Patent: Apr. 28, 2015

(54) WIRELESS COMMUNICATION SYSTEM, BASE STATION DEVICE, MOBILE STATION DEVICE, AND COMMUNICATION METHOD

(75) Inventors: Kazuhiro Abe, Osaka (JP); Isao Hirakawa, Osaka (JP)

(73) Assignee: Huawei Technologies Co., Ltd., Shenzhen (CN)

( * ) Notice: Subject to any disclaimer, the term of this patent is extended or adjusted under 35 U.S.C. 154(b) by 396 days.

(21) Appl. No.: 13/057,723

(22) PCT Filed: Aug. 4, 2009

(86) PCT No.: PCT/JP2009/063796
§ 371 (c)(1),
(2), (4) Date: Feb. 4, 2011

(87) PCT Pub. No.: WO2010/016481
PCT Pub. Date: Feb. 11, 2010

(65) Prior Publication Data
US 2011/0182376 A1    Jul. 28, 2011

(30) Foreign Application Priority Data

Aug. 5, 2008  (JP) ................................. 2008-201657

(51) Int. Cl.
| | | |
|---|---|---|
| H04W 72/00 | (2009.01) | |
| H04B 7/00 | (2006.01) | |
| G01R 31/08 | (2006.01) | |
| G06F 11/00 | (2006.01) | |
| G08C 15/00 | (2006.01) | |
| H04J 1/16 | (2006.01) | |
| H04J 3/14 | (2006.01) | |
| H04L 1/00 | (2006.01) | |
| H04L 12/26 | (2006.01) | |
| H04W 4/00 | (2009.01) | |
| H04B 1/38 | (2006.01) | |
| H04L 5/16 | (2006.01) | |
| H04K 1/10 | (2006.01) | |
| H04L 27/28 | (2006.01) | |
| H04B 7/02 | (2006.01) | |
| H04L 1/02 | (2006.01) | |
| H04L 5/00 | (2006.01) | |
| H04L 27/26 | (2006.01) | |

(52) U.S. Cl.
CPC ............ *H04L 5/0048* (2013.01); *H04L 5/0023* (2013.01); *H04L 27/2613* (2013.01)

(58) Field of Classification Search
CPC .......... H04L 1/04; H04L 1/06; H04L 1/0009; H04L 1/0013; H04L 1/0618; H04L 5/0007; H04L 5/0016; H04L 5/0021; H04L 5/0023; H04L 5/0028; H04L 5/0094; H04L 27/261; H04L 27/0606; H04L 27/2601; H04L 27/2602; H04L 27/2613; H04L 1/0001; H04L 1/0003; H04L 1/0006; H04L 1/0619; H04L 1/0632; H04L 1/08; H04L 1/20; H04L 1/26; H04L 5/0035; H04L 5/0044; H04L 5/0048; H04L 27/2624; H04L 27/2626; H04L 27/2647; H04L 1/009; H04B 7/0413; H04B 7/0634; H04B 7/0684; H04B 7/0619; H04B 7/0632; H04W 52/42; H04W 52/346; H04W 72/0453; H04W 52/04; H04W 52/146; H04W 52/16; H04W 72/082; H04W 72/085; H04H 20/42
USPC ................ 455/91, 101, 103, 450, 451, 452.1, 455/452.2, 453, 464, 509, 562.1, 132, 423, 455/436, 502, 522, 524; 370/206, 207, 281, 370/343, 344, 480, 491, 203, 204, 208, 210, 370/241, 252, 311, 319, 328, 329, 334, 335, 370/338, 436, 468, 478, 500; 375/146, 147, 375/135, 219, 260, 261, 267, 299, 360
See application file for complete search history.

(56) References Cited

U.S. PATENT DOCUMENTS

| | | | |
|---|---|---|---|
| 7,440,509 B2 * | 10/2008 | Baum ........................... | 375/260 |
| 8,611,277 B2 * | 12/2013 | Krishnamurthy et al. ..... | 370/328 |
| 2007/0248113 A1* | 10/2007 | Ko et al. ....................... | 370/436 |
| 2008/0063012 A1 | 3/2008 | Nakao et al. | |

| | | | | |
|---|---|---|---|---|
| 2008/0267318 | A1* | 10/2008 | Ihm et al. | 375/299 |
| 2009/0016461 | A1* | 1/2009 | Jitsukawa et al. | 375/267 |
| 2009/0041151 | A1* | 2/2009 | Khan et al. | 375/267 |
| 2009/0286497 | A1* | 11/2009 | Akkarakaran et al. | 455/226.3 |
| 2010/0103906 | A1* | 4/2010 | Montojo et al. | 370/335 |
| 2010/0103949 | A1* | 4/2010 | Jung et al. | 370/468 |
| 2010/0190486 | A1* | 7/2010 | Kimura et al. | 455/423 |
| 2010/0220808 | A1* | 9/2010 | Kishigami et al. | 375/295 |
| 2011/0243023 | A1* | 10/2011 | Taoka et al. | 370/252 |

FOREIGN PATENT DOCUMENTS

| | | |
|---|---|---|
| JP | 2008-103961 A | 5/2008 |
| WO | WO 2008/149533 A1 | 12/2008 |
| WO | WO 2009/139383 A1 | 11/2009 |

OTHER PUBLICATIONS

European Search Report issued in European Patent Application No. 09804964.6 on Aug. 2, 2011.
NEC Group: "Clarifications on Cell Specific RS Power Boosting", 3GPP Draft; R1-081013-RS_Scaling, 3rd Generation Partnership Project (3GPP), Mobile Competence Centre; 650, Route Des Lucioles; F-06921 Sophia-Antipolis Cedes; France, vol. RAN WG1, Feb. 6, 2008, XP050109477, Sorrento, Italy.
Qualcomm Europe: "Power offsets in UE-specific RS operation", 3GPP Draft; R1-083177 DRS Power Offsets, 3rd Generation Partnership Project (3GPP), Mobile Competence Centre; 650, Route Des Lucioles; F-06921 Sophia-Antipolis Cedex; France, No. Jeju; Aug. 12, 2008, XP050316609.
Catt, "DRS Power Boosting" R1-081779, 3GPP, May 5, 2008.
LG Electronics, "Downlink transmit power boosting", R1-070250, Jan. 15, 2007.
Motorola, Isses of non-overlapping DL references signal with power boosting, R1-062608, 3GPP, Oct. 9, 2006.
Nokia et al., On the conflict between UE specific RS with P/S-SCH and P-BCH, R1-081443, 3Gpp, Mar. 21, 2008.
Nokia, Nokia Siemens Networks, "Way forward of DRS EPRE", R1-082607, 3GPP, Jun. 30, 2008.
Nortel, "Modification on UE-Specific RS for Extended CP", R1-082508, 3GPP, Jun. 30, 2008.
Samsung, Power Scaling and DL RS boosting, R1-081231, 3GPP Mar. 31, 2008.

* cited by examiner

*Primary Examiner* — Yuwen Pan
*Assistant Examiner* — Paul P Tran
(74) *Attorney, Agent, or Firm* — Slater & Matsil, L.L.P.

(57) ABSTRACT

A reference signal specific to each base station device and a reference signal specific to each mobile station device are not mixed within one OFDM symbol of a resource block, and OFDM symbols including the reference signal specific to each mobile station device are arranged at regular intervals on a time axis. By using such a signal arrangement pattern, it is possible to overcome the problems in Non-Patent Document 1 mentioned above caused by mixing a reference signal specific to each base station device and a reference signal specific to each mobile station device in one OFDM symbol. Thus, it becomes possible to prevent the reference signal specific to each base station device and the reference signal specific to each mobile station device from being mixed within one OFDM symbol of a resource block.

33 Claims, 17 Drawing Sheets

Prior Art

FIG. 1B
(a)
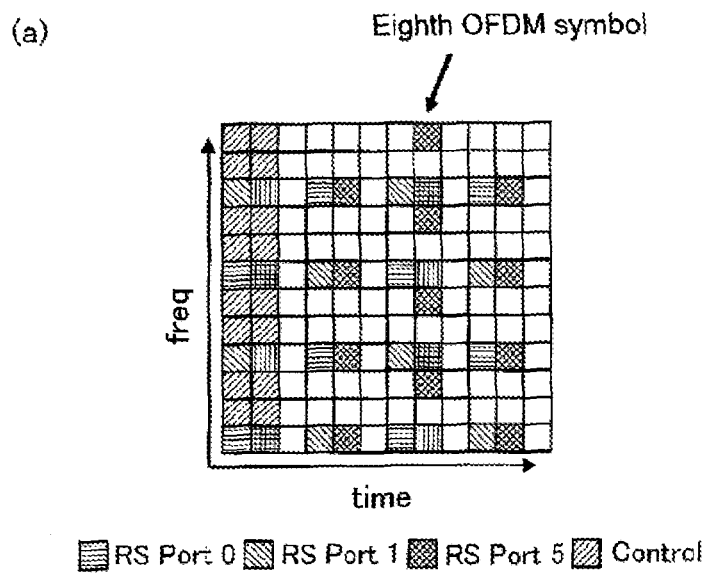
Before modification
(b)
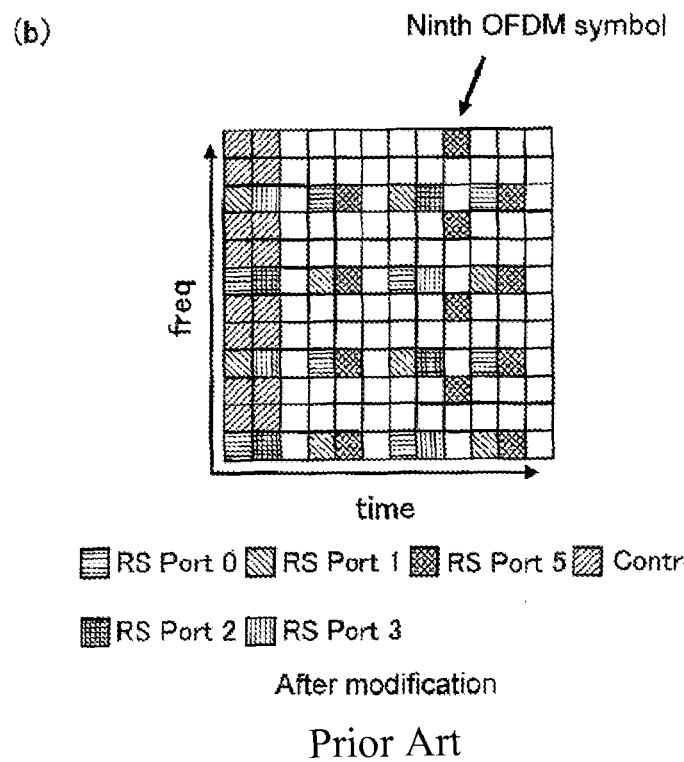
After modification
Prior Art Prior Art Prior Art Prior Art FIG. 5
(a)
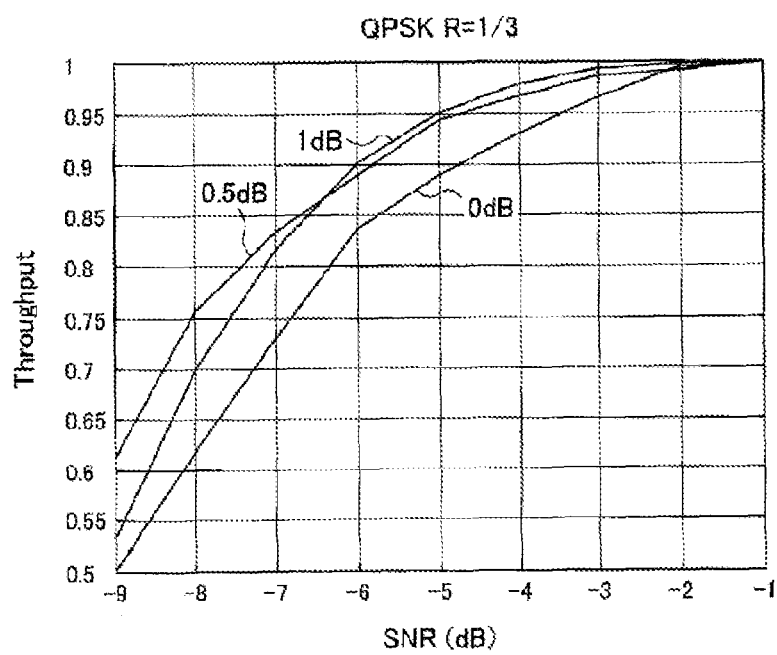
(b)
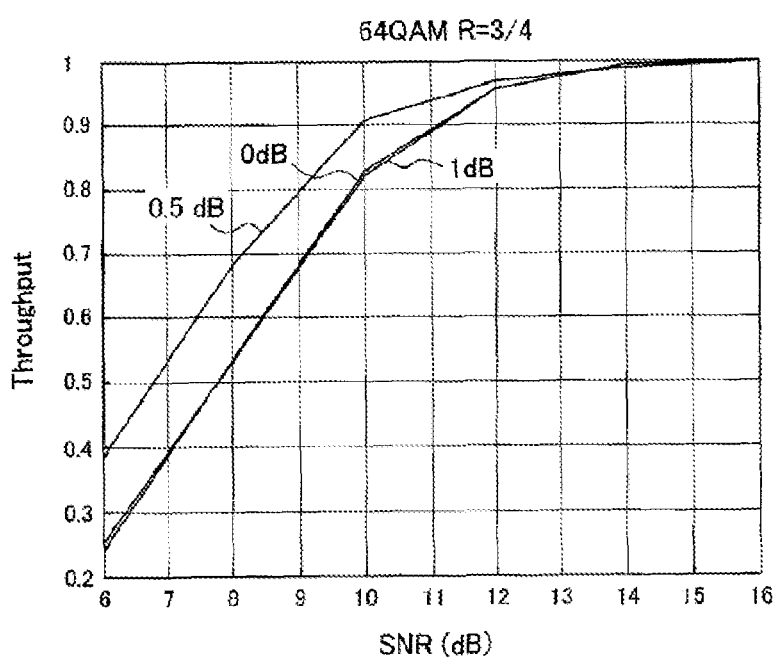
Prior Art

FIG. 11

| | | D 2a | D a | D 2a | D 2a | D a | DRS 2a | D 2a | D a | D 2a | D 2a |
|---|---|---|---|---|---|---|---|---|---|---|---|
| | | D 2a | D a | D 2a | D 2a | D a | D a | D 2a | D a | D 2a | D 2a |
| | | D 2a | CRS 3a | DRS 2a | D 2a | CRS 3a | CRS 3a | D 2a | CRS 3a | DRS 2a | D 2a |
| | | D 2a | D a | D 2a | D 2a | D a | DRS 2a | D 2a | D a | D 2a | D 2a |
| | | D 2a | D a | D 2a | D 2a | D a | D a | D 2a | D a | D 2a | D 2a |
| | | D 2a | CRS 3a | DRS 2a | D 2a | CRS 3a | CRS 3a | D 2a | CRS 3a | DRS 2a | D 2a |
| | | D 2a | D a | D 2a | D 2a | D a | DRS 2a | D 2a | D a | D 2a | D 2a |
| | | D 2a | D a | D 2a | D 2a | D a | D a | D 2a | D a | D 2a | D 2a |
| | | D 2a | CRS 3a | DRS 2a | D 2a | CRS 3a | CRS 3a | D 2a | CRS 3a | DRS 2a | D 2a |
| | | D 2a | D a | D 2a | D 2a | D a | DRS 2a | D 2a | D a | D 2a | D 2a |
| | | D 2a | D a | D 2a | D 2a | D a | D a | D 2a | D a | D 2a | D 2a |
| | | D 2a | CRS 3a | DRS 2a | D 2a | CRS 3a | CRS 3a | D 2a | CRS 3a | DRS 2a | D 2a |

OFDM symbols including a control signal

DRS a — A reference signal specific to each mobile station device is arranged
The power of the reference signal specific to each mobile station device is a

CRS a — A reference signal specific to each base station device is arranged
The power of the reference signal d specific to each base station device is a

Due to puncturing, neither a data signal nor a reference signal can be arranged

D a — A data signal is arranged
The power of the data signal is a

WIRELESS COMMUNICATION SYSTEM, BASE STATION DEVICE, MOBILE STATION DEVICE, AND COMMUNICATION METHOD

TECHNICAL FIELD

The present invention relates to a wireless communication system, a base station device, a mobile station device, and a communication method.

BACKGROUND ART

Currently, with respect to mobile communications that employ an OFDMA (Orthogonal Frequency Division Multiple Access) scheme, when performing communications by way of beamforming, a reference signal specific to each base station device (e.g., a common reference signal (CRS)), a reference signal specific to each mobile station device (e.g., a dedicated reference signal (DRS)), and a data signal are arranged in a resource block. Here, the reference signal specific to each base station device is used chiefly in the reproduction of a control signal, in measuring channel quality, and so forth. The reference signal specific to each mobile station device is used chiefly in the reproduction of the data signal. It is noted that since the reproduction of a control signal, measuring channel quality, etc., are not the characterizing parts of the present invention, descriptions pertaining to the control signal, and the measuring of channel quality will herein be omitted.

On the other hand, there is a problem in that, when the reference signal specific to each base station device and the reference signal specific to each mobile station device are mixed within one OFDM (Orthogonal Frequency Division Multiplexing) symbol of the resource block, restrictions for frequency shifting the reference signal specific to each base station device and the reference signal specific to each mobile station device become stringent.

In addition, under such conditions where the power of the reference signal specific to each base station device is uniform within the resource block, and where the power of the data signal within the OFDM symbol including the reference signal specific to each base station device is uniform within the resource block, when increasing the power of the reference signal specific to each base station device in order to improve cell coverage, cell edge throughput, etc., there is a problem in that, as shown in FIG. 1A, because the number of data signals in OFDM symbols in which the reference signal specific to each base station device and the reference signal specific to each mobile station device are mixed is less than the number of data signals within OFDM symbols including the reference signal specific to each base station device, the power of the data signals within OFDM symbols including only the reference signal specific to each base station device becomes unnecessarily low. For example, whereas the total power of the third OFDM symbol is 24a, the total power of the fourth OFDM is 20a as indicated with the arrow in FIG. 1A. As such, at the fourth OFDM symbol, the data signals drop by an extra 4a.

First, in Non-Patent Document 1, there is presented a problem wherein when a reference signal specific to each base station device and a reference signal specific to each mobile station device are mixed within one OFDM symbol of a resource block, restrictions for frequency shifting the reference signal specific to each base station device and the reference signal specific to each mobile station device become stringent.

In Non-Patent Document 1, in order to overcome this problem, as shown in FIG. 1B, it is proposed that the reference signal specific to each mobile station device in the eighth OFDM symbol be moved to the ninth OFDM symbol so that the reference signal specific to each base station device and the reference signal specific to each mobile station device would not be mixed within one OFDM symbol.

Next, in Non-Patent Document 2, the relationship between the power of a reference signal specific to each mobile station device and the power of a data signal is described.

In Non-Patent Document 2, the power of a reference signal specific to each mobile station device is defined as being the same as the power of a data signal within an OFDM symbol of the same resource block as that reference signal specific to each mobile station device and that does not include a reference signal specific to each base station device.

Next, in Non-Patent Document 3, there is proposed a method for increasing the power of a reference signal specific to each base station device in order to improve cell coverage, cell edge throughput, etc.

In Non-Patent Document 3, as shown in FIG. 2, an SFBC (Space Freqency Block Code)+FSTD (Frequency Switched Transmit Diversity) encoding process is considered. It is proposed that the power of a data signal within the same OFDM symbol as a reference signal specific to each base station device be decreased in order to increase the power of that reference signal specific to each base station device within one OFDM symbol of a resource block.

In Non-Patent Document 3, because the power of the data signal decreases, diversity gain decreases, and throughput characteristics, etc., degrade.

Next, in Non-Patent Document 4, the power of a reference signal specific to each base station device is increased in order to improve cell coverage, cell edge throughput, etc. Here, as shown in FIG. 3, SFBC (Space Freqency Block Code)+FSTD (Frequency Switched Transmit Diversity) encoding is considered. It is proposed that unused subcarriers be set within the same OFDM symbol as a reference signal specific to each base station device in order to increase the power of that reference signal specific to each base station device within one OFDM symbol of a resource block.

In Non-Patent Document 4, because the power of the data signal does not decrease, there is no degradation in throughput characteristics, etc., that results therefrom. However, there are concerns that throughput characteristics, etc., may degrade by an amount corresponding to data signals that may be arranged in the unused subcarriers.

Next, in Non-Patent Document 5, as shown in FIG. 4, it is demonstrated that when performing communications by way of beamforming, the accuracy of channel estimation is improved by increasing the power (for example, from 2 a to 5 a) of a reference signal specific to each mobile station device. In conjunction therewith, the power of a data signal within an OFDM symbol of the same resource block as the reference signal specific to each mobile station device, whose power is increased, is decreased.

In Non-Patent Document 5, such results as those shown in FIG. 5 are demonstrated. FIG. 5 is a diagram where a case in which the modulation scheme is 64 QAM (Quadrature Amplitude Modulation) and a case in which the modulation scheme is QPSK (Quadrature Phase Shift Keying) are compared, thereby demonstrating the influence the magnitude of the power of the reference signal specific to each mobile station device has on throughput characteristics.

As shown in FIG. 5, it can be seen that the best throughput is achieved when the power of the reference signal specific to each mobile station device is increased by 0.5 [dB]. The reason for this is speculated to be that beamforming gain decreases when the power of the data signal is decreased.

Accordingly, for a case in which communications are performed by way of beamforming, attempts to improve throughput were limited to an increase by 0.5 [dB] or so at most for the power of the reference signal specific to each mobile station device.

Non-Patent Document 1: 3GPP TSG RAN1 #47bis, R1-082508, "Modification on UE-Specific RS for Extended CP"

Non-Patent Document 2: 3GPP TSG RAN1 #52bis, R1-082607, "Way forward on DRS EPRE"

Non-Patent Document 3: 3GPP TSG RAN1 #46bis, R1-062608, "Issues of non-overlapping DL reference signal with power boosting"

Non-Patent Document 4: 3GPP TSG RAN1 #47bis, R1-070250, "Downlink transmit power boosting"

Non-Patent Document 5: 3GPP TSG RAN1 #53, R1-081779, "DRS Power Boosting"

DISCLOSURE OF THE INVENTION

Problems to be Solved by the Invention

First, there is a problem in that when a reference signal specific to each base station device (e.g., a common reference signal (CRS)) and a reference signal specific to each mobile station device (e.g., a dedicated reference signal (DRS)) are mixed within one OFDM symbol of a resource block, restrictions on patterns in frequency shifting the reference signal specific to each base station device and the reference signal specific to each mobile station device become stringent. Accordingly, arranging for the reference signal specific to each base station device and the reference signal specific to each mobile station device to not be mixed within one OFDM symbol may be listed as a problem.

In Non-Patent Document 1 mentioned above, as shown in FIG. 1B, by moving the reference signal specific to each mobile station device in the eighth OFDM symbol to the ninth OFDM symbol, the reference signal specific to each base station device and the reference signal specific to each mobile station device are prevented from being mixed within one OFDM symbol. However, since there is a gap corresponding to three OFDM symbols between the reference signal specific to each mobile station device in the fifth OFDM symbol and the reference signal specific to each mobile station device in the ninth OFDM symbol, it is anticipated that channel estimation accuracy would degrade if the mobile station device were to move at high speed. Accordingly, it is necessary to contemplate a method to overcome this.

Next, when the power of the data signal is decreased in order to increase the power of the reference signal specific to each base station device, as shown in FIG. 1A, there is a problem in that the power of the data signal within the OFDM symbol including only the reference signal specific to each base station device becomes unnecessarily low.

In addition, as the power of the data signal decreases, cell edge throughput, etc., degrade. Accordingly, a method for improving cell edge throughput, etc., is desired.

Next, under such conditions as those indicated in Non-Patent Document 2 where the power of the reference signal specific to each mobile station device is equal to the power of the data signal within the OFDM symbol that does not include the reference signal specific to each base station device, how to increase the power of the reference signal specific to each base station device also becomes a problem.

An object of the present invention is to arrange for a reference signal specific to each base station device and a reference signal specific to each mobile station device to not be mixed within one OFDM symbol of a resource block, and to solve the problems involved in increasing the power of reference signals within an OFDM symbol in which a reference signal specific to each base station device and a reference signal specific to each mobile station device are mixed within one OFDM symbol of a resource block.

Means for Solving the Problems

According to one aspect of the present invention, there is provided a wireless communication system comprising base station devices and mobile station devices, wherein a signal arrangement part of each of the base station devices comprises: means that prevents a reference signal specific to each of the base station devices and a reference signal specific to each of the mobile station devices from being mixed within the same OFDM symbol of the same resource block; or means for increasing the power of the reference signal specific to each of the base station devices, wherein the reference signal specific to each of the base station devices and the reference signal specific to each of the mobile station devices are mixed within the same OFDM symbol of the same resource block. By way of the means that prevents the reference signal specific to each of the base station devices and the reference signal specific to each of the mobile station devices from being mixed within the same OFDM symbol of the same resource block, it is possible to eliminate restrictions on patterns in frequency shifting the reference signal specific to each of the base station devices and the reference signal specific to each of the mobile station devices, as well as influences of increasing the power of the reference signal specific to each of the base station devices, etc. In addition, even if the reference signal specific to each of the base station devices and the reference signal specific to each of the mobile station devices are mixed within the same OFDM symbol of the same resource block, by providing the means for increasing the power of the reference signal specific to each of the base station devices, it is possible to reduce the influences caused by increasing the power of the reference signal specific to each of the base station devices in order to improve cell coverage, cell edge throughput, etc.

Based on a signal arrangement pattern comprising information for performing, with respect to a resource block, an arrangement of the reference signal specific to each of the base station devices, the reference signal specific to each of the mobile station devices, and a data signal, and an adjustment of the power of the reference signal specific to each of the base station devices, the reference signal specific to each of the mobile station devices, and the data signal, it is preferable that the signal arrangement part perform, with respect to the resource block, an arrangement of the reference signal specific to each of the mobile station devices, the reference signal specific to each of the base station devices, and the data signal, and an adjustment of the power of the reference signal specific to each of the base station devices, the reference signal specific to each of the mobile station devices, and the data signal.

It is preferable that the signal arrangement pattern be arranged such that the reference signal specific to each of the base station devices and the reference signal specific to each of the mobile station devices are not mixed within the same OFDM symbol of the same resource block. Or, if the reference signal specific to each of the base station devices and the reference signal specific to each of the mobile station devices are mixed within the same OFDM symbol of the same resource block, the signal arrangement pattern may be arranged such that the power of the reference signal specific to each of the mobile station devices within the concerned OFDM symbol is equal to the power of the data signal within the concerned OFDM symbol. Or, if the reference signal specific to each of the base station devices and the reference signal specific to each of the mobile station devices are mixed within the same OFDM symbol of the same resource block, and if the power of the reference signal specific to each of the base station devices is to be increased, the signal arrangement pattern may also be arranged such that unused resource element are set in the concerned OFDM symbol.

Or, if the reference signal specific to each of the mobile station devices and the reference signal specific to each of the base station devices are mixed within the same OFDM symbol of the same resource block, and if the power of the reference signal specific to each of the base station devices is to be increased, the signal arrangement pattern may also be arranged such that the power of the reference signal specific to each of the mobile station devices in the concerned OFDM symbol is greater than the power of the data signal. Or, if the reference signal specific to each of the mobile station devices and the reference signal specific to each of the base station devices are contained within the same OFDM symbol of the same resource block, the signal arrangement pattern may also be arranged such that methods for adjusting power are made to differ between the concerned OFDM symbol and other OFDM symbols. Or, if the reference signal specific to each of the base station devices and the reference signal specific to each of the mobile station devices are mixed within the same OFDM symbol of the same resource block, the signal arrangement pattern may also be arranged such that the power of the reference signal specific to each of the mobile station devices within the concerned OFDM symbol is equal to the power of the data signal of an OFDM symbol of the concerned resource block and in which the reference signal specific to each of the base station devices is included. In addition, it is preferable that the base station devices comprise: a modulation part that modulates an externally inputted data signal; a direction of arrival estimation part that estimates the direction of arrival of a radio wave; a first weight control part that controls a weight for steering a radio wave in the direction of arrival of a signal; a transmit beamforming part that applies weighting for steering a radio wave; and a transmit part that transmits a signal to a mobile station device.

The present invention may also be the base station device in the wireless communication system mentioned above, wherein the modulation part performs quadrature amplitude modulation with respect to an externally inputted data signal. In addition, it may also be the base station device in the wireless communication system mentioned above, wherein the first weight control part controls a weight for steering a radio wave in the direction of arrival of a signal estimated at the direction of arrival estimation part. In addition, the present invention may also be a base station device wherein the transmit beamforming part performs weighting with respect to a resource block using a weight for steering a radio wave in the direction of arrival of a radio wave estimated at the first weight control part, and wherein the weighted resource block is outputted to the transmit part.

Further, the present invention may also be a base station device wherein the direction of arrival estimation part estimates, from a radio wave transmitted from a mobile station device, the direction of arrival of that radio wave, and outputs the estimated direction of arrival of the radio wave to the first weight control part. In addition, the present invention may also be a base station device wherein the transmit part transmits to a mobile station device a resource block to which the beamforming outputted from the transmit beamforming part is applied.

In addition, with respect to the wireless communication system mentioned above, it is preferable that the mobile station devices comprise: a receive part that receives a resource block; a second weight control part that performs channel estimation using a reference signal arranged in the resource block and controls a weight for equalizing a data signal arranged in the resource block; an equalization part that applies to the data signal arranged in the resource block the weight for equalizing that data signal; a demodulation part that demodulates the equalized data signal; and a measurement signal transmit part that transmits to the base station device a signal that the base station device uses to estimate the direction of arrival of the signal. The receive part of the mobile station device in the wireless communication system mentioned above is characterized in that it receives a resource block transmitted from the transmit part of the base station device. In addition, it may also be a mobile station device wherein the second weight control part estimates a channel using a reference signal arranged in a resource block, and controls a weight for equalizing a data signal arranged in the resource block from the estimated channel. In addition, it may also be a mobile station device wherein the equalization part applies to the data signal arranged in the resource block the weight outputted from the second weight control part. In addition, it may also be a mobile station device wherein the demodulation part performs quadrature amplitude demodulation with respect to the equalized data signal. Further, it may also be a mobile station device wherein the measurement signal transmit part transmits a signal that the direction of arrival estimation part of the base station device uses in order to estimate the direction of arrival of the signal transmitted from the mobile station device.

Further, the present invention is a communication method of the base station device for communicating with the mobile station device, the communication method comprising: a first step of modulating an externally inputted data signal; a second step of performing, based on a signal arrangement pattern and with respect to a resource block, an arrangement of a reference signal specific to each base station device, a reference signal specific to each mobile station device, and a data signal for which power has been adjusted, and an adjustment of the power of the reference signal specific to each base station device, the reference signal specific to each mobile station device, and the data signal; a third step of estimating the direction of arrival of a signal transmitted from a mobile station device; a fourth step of controlling a weight for steering a radio wave in the direction of arrival of the signal; a fifth step of applying to the resource block the weight for steering the radio wave; and a sixth step of transmitting the resource block to the mobile station device.

Or it may be a communication method of the mobile station device for communicating with the base station device in the wireless communication system mentioned above, the communication method comprising: a first step of receiving a resource block; a second step of performing channel estimation using a reference signal arranged in the resource block and of controlling a weight for equalizing a data signal arranged in the resource block; a third step of applying to the data signal arranged in the resource block the weight for equalizing that data signal; a fourth step of demodulating the equalized data signal; and a fifth step of transmitting to the base station device a signal that the base station device uses in order to estimate the direction of arrival of the signal.

In addition, the present invention is a communication method that transmits data from base stations to mobile stations using a plurality of second domains configured by arranging in a frequency direction a plurality of first domains defined by frequency and time, the communication method including, when the base station adjusts the power of each of the first domains by arranging in each of the first domains one of the data, a reference signal specific to each of the base stations, and a reference signal specific to each of the mobile stations, control that sets ratios of the transmit power of the first domain in which the reference signal specific to each of the base stations is arranged and of the first domain in which the data is arranged, wherein the ratios of the transmit power of the first domain in which the reference signal specific to each of the mobile stations is arranged and of the first domain in which the data is arranged are equal within the second domains including the reference signal specific to each of the mobile stations.

It is preferable that the ratios of the transmit power of the first domain in which the data is arranged and the transmit power of the first domain in which the reference signal specific to each of the mobile stations is arranged be made equal across a plurality of the second domains in which the reference signal specific to each of the mobile stations is arranged. The transmit power of the first domain in which the data is arranged and the transmit power of the first domain in which the reference signal specific to each of the mobile stations is arranged may also be made equal within the second domain in which the reference signal specific to each of the mobile stations is arranged.

In addition, it is preferable that the ratios of the transmit power of the first domain in which the reference signal specific to each of the base stations is arranged and the transmit power of the first domain in which the data is arranged within the second domain including the reference signal specific to each of the base stations differ from the ratios of the transmit power of the first domain in which the reference signal specific to each of the base stations is arranged and the transmit power of the first domain in which the data is arranged within the second domain not including the reference signal specific to each of the base stations. It is preferable that the base stations perform beamforming with respect to the mobile stations.

In addition, the present invention is a communication method that transmits data from base stations to mobile stations using a plurality of second domains configured by arranging in a frequency direction a plurality of first domains defined by frequency and time, the communication method including, when the base station determines the power of each of the first domains by arranging in each of the first domains one of the data, a reference signal specific to each of the base stations, and a reference signal specific to each of the mobile stations, control that sets ratios of the transmit power of the first domain in which the reference signal specific to each of the base stations is arranged and of the first domain in which the data is arranged, wherein the ratios of the transmit power of the first domain in which the reference signal specific to each of the mobile stations is arranged and of the first domain in which the data is arranged are equal.

The present invention may also be a program for causing a computer to execute the methods mentioned above, and it may also be a computer readable storage medium on which such a program is recorded.

In addition, each of the elements of the present invention is capable of standing as an invention on its own. For example, where there is recited a base station device and a mobile station device as elements for a system invention, it is possible to extract an invention of a base station device and an invention of a mobile station device based on the features of each device.

Effects of the Invention

By not mixing a reference signal specific to each base station device and a reference signal specific to each mobile station device within one OFDM symbol of a resource block, various problems associated with increasing the power of the reference signal specific to each base station device in order to improve cell coverage, cell edge throughput, etc., are mitigated. In addition, restrictions on patterns in frequency shifting the reference signal specific to each base station device and the reference signal specific to each mobile station device are mitigated.

Even when the reference signal specific to each base station device and the reference signal specific to each mobile station device are mixed within one OFDM symbol of the resource block, it becomes possible to solve the various problems associated with increasing the power of the reference signal specific to each base station device in order to improve cell coverage, cell edge throughput, etc.

BRIEF DESCRIPTION OF THE DRAWINGS

FIG. 1B is a diagram showing a method proposed in Non-Patent Document 1, wherein a reference signal specific to each mobile station device in the eighth OFDM symbol is moved to the ninth OFDM symbol so that a reference signal specific to each base station device and the reference signal specific to each mobile station device would not be mixed within one OFDM symbol.

FIG. 5 is a diagram showing, with respect to the proposal of Non-Patent Document 5, the influences that the magnitude of the power of a reference signal specific to each mobile station device has on throughput characteristics, comparing a case where the modulation scheme is 64 QAM (Quadrature Amplitude Modulation) and a case where the modulation scheme is QPSK (Quadrature Phase Shift Keying).

FIG. 11 is a diagram showing one example of a signal arrangement pattern according to the fourth embodiment of the present invention.

DESCRIPTION OF SYMBOLS $10a$ . . . Direction of arrival estimation part; $10c$-$4$~$17c$-$4$ . . . antenna 0~antenna 7; $10b$ . . . modulation part; $10c$~$17c$ . . . signal processing device 0~signal processing device 7; $10c$-$1$~$17c$-$1$ . . . signal arrangement part; $10c$-$2$~$17c$-$2$ . . . transmit beamforming part; $10c$-$3$~$17c$-$3$ . . . transmit part; $11a$ . . . weight control part 1; $100a$ . . . base station device; $20a$-$1$ . . . antenna; $20a$-$2$ . . . receive part; $20a$-$3$ . . . equalization part; $20b$ . . . weight control part 2; $20c$ . . . demodulation part; $20d$ . . . transmit part; $200a$ . . . mobile station device; $30a$ . . . direction of arrival estimation part; $30c$-$4$~$37c$-$4$ . . . antenna A0~antenna A7; $30b$ . . . modulation part; $30c$~$37c$ . . . signal processing device A0~signal processing device A7; $30c$-$1$~$37c$-$1$ . . . signal arrangement part; $30c$-$2$~$37c$-$2$ . . . transmit beamforming part; $30c3$~$37c$-$3$ . . . transmit part; $31a$ . . . weight control part 1; $30d$-$4$~$33d$-$4$ . . . antenna B0~antenna B3; $30d$~$33d$ . . . signal processing device B0~signal processing device B3; $30d$-$1$~$33d$-$1$ . . . signal arrangement part; $30d$-$3$~$33d$-$3$ . . . transmit part.

BEST MODE FOR CARRYING OUT THE INVENTION

Communication techniques according to embodiments of the present invention are described below with reference to the drawings. It is noted that each embodiment from the first embodiment to the seventh embodiment is described below.

First Embodiment

First, a communication technique according to the first embodiment of the present invention is described. A description is provided taking as an example a case where a communication system according to the present embodiment is such that a base station device comprises eight antennas, and a mobile station (terminal station) device comprises one antenna.

Figure 8A:
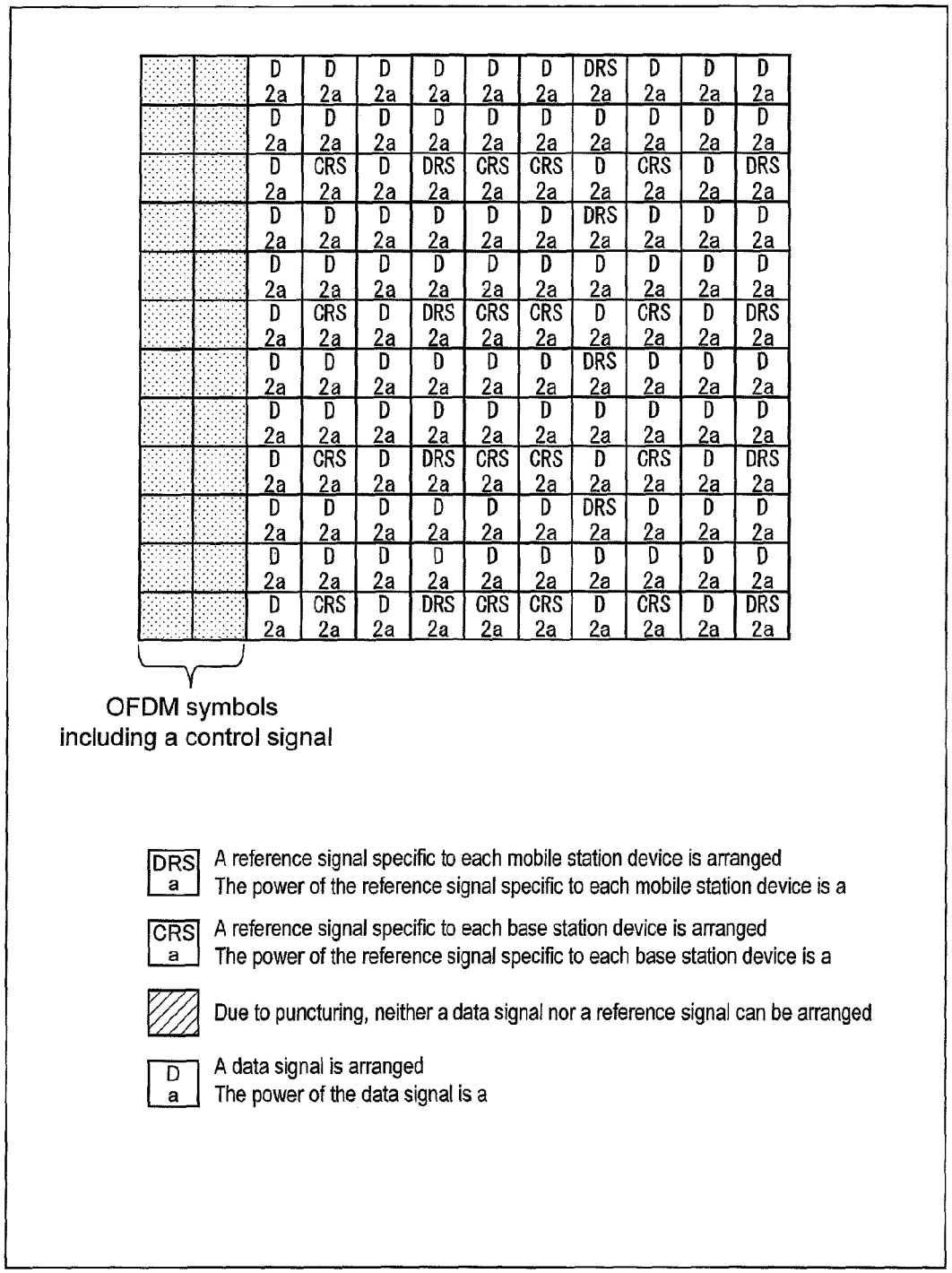
FIG. 8A is a diagram showing one example of a signal arrangement pattern according to the present embodiment.

FIG. 8A is a diagram showing one example of a signal arrangement pattern of a resource block according to the present embodiment. As shown in FIG. 8A, in the first embodiment, a reference signal specific to each base station device and a reference signal specific to each mobile station device are not contained within one OFDM symbol of the resource block. OFDM symbols including the reference signal specific to each mobile station device are arranged at regular intervals on a time axis. By using such a signal arrangement pattern, problems caused by the containing of the reference signal specific to each base station device and the reference signal specific to each mobile station device within one OFDM symbol of the resource block as indicated in Non-Patent Document 1 mentioned above are overcome, while at the same time suppressing channel estimation degradation that occurs when the mobile station is moving at high speed.

Figure 1A:
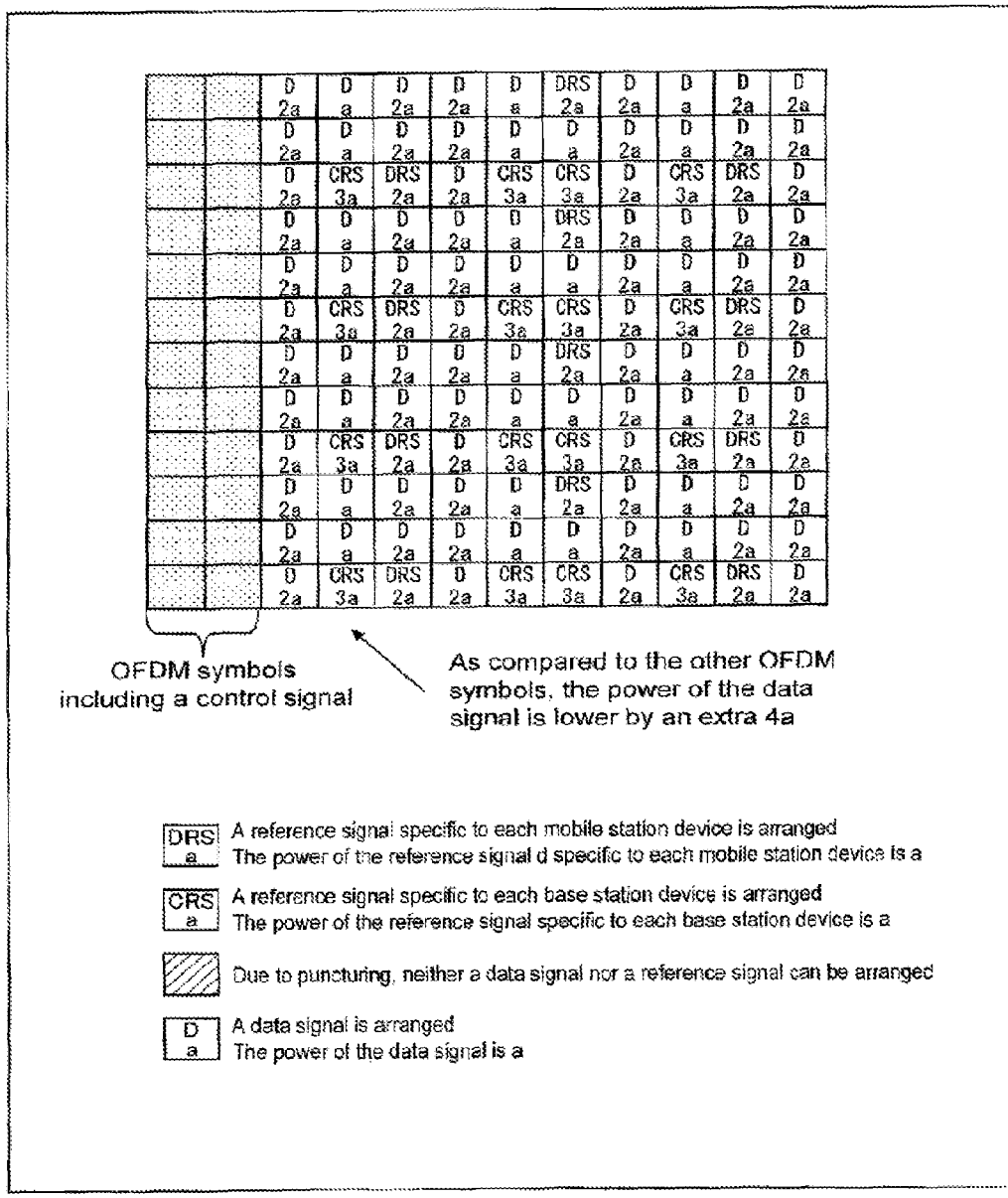
FIG. 1A is a diagram showing a method for a case where the power of a reference signal specific to each base station device is increased.
Figure 2:
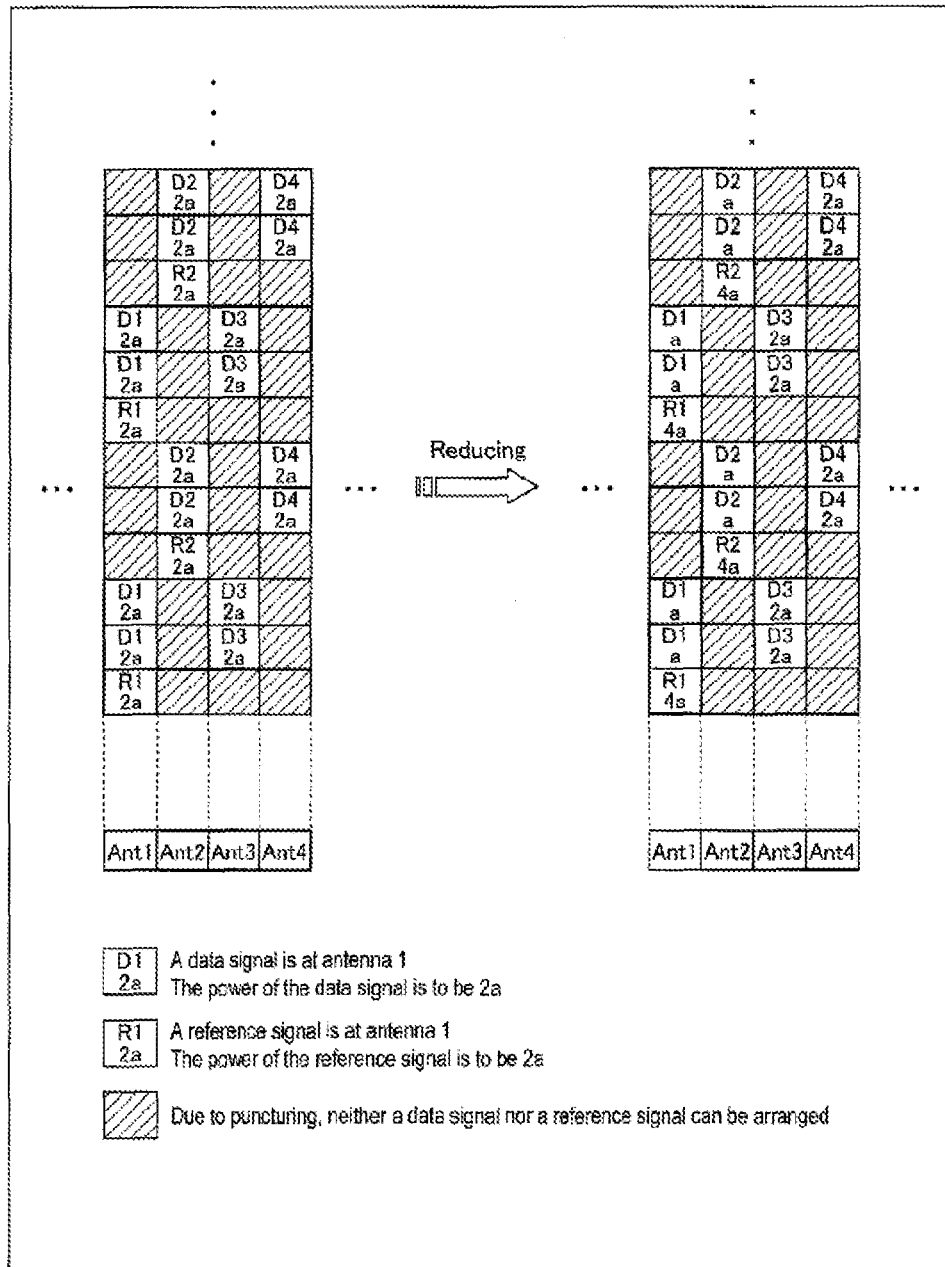
FIG. 2 is a diagram showing a method proposed in Non-Patent Document 3, wherein, at the time of SFBC (Space Freqency Block Code)+FSTD (Frequency Switched Transmit Diversity) encoding, in order to increase the power of a reference signal specific to each base station device within one OFDM symbol of a resource block, the power of a data signal within the same OFDM symbol as that reference signal specific to each base station device is decreased.
Figure 3:
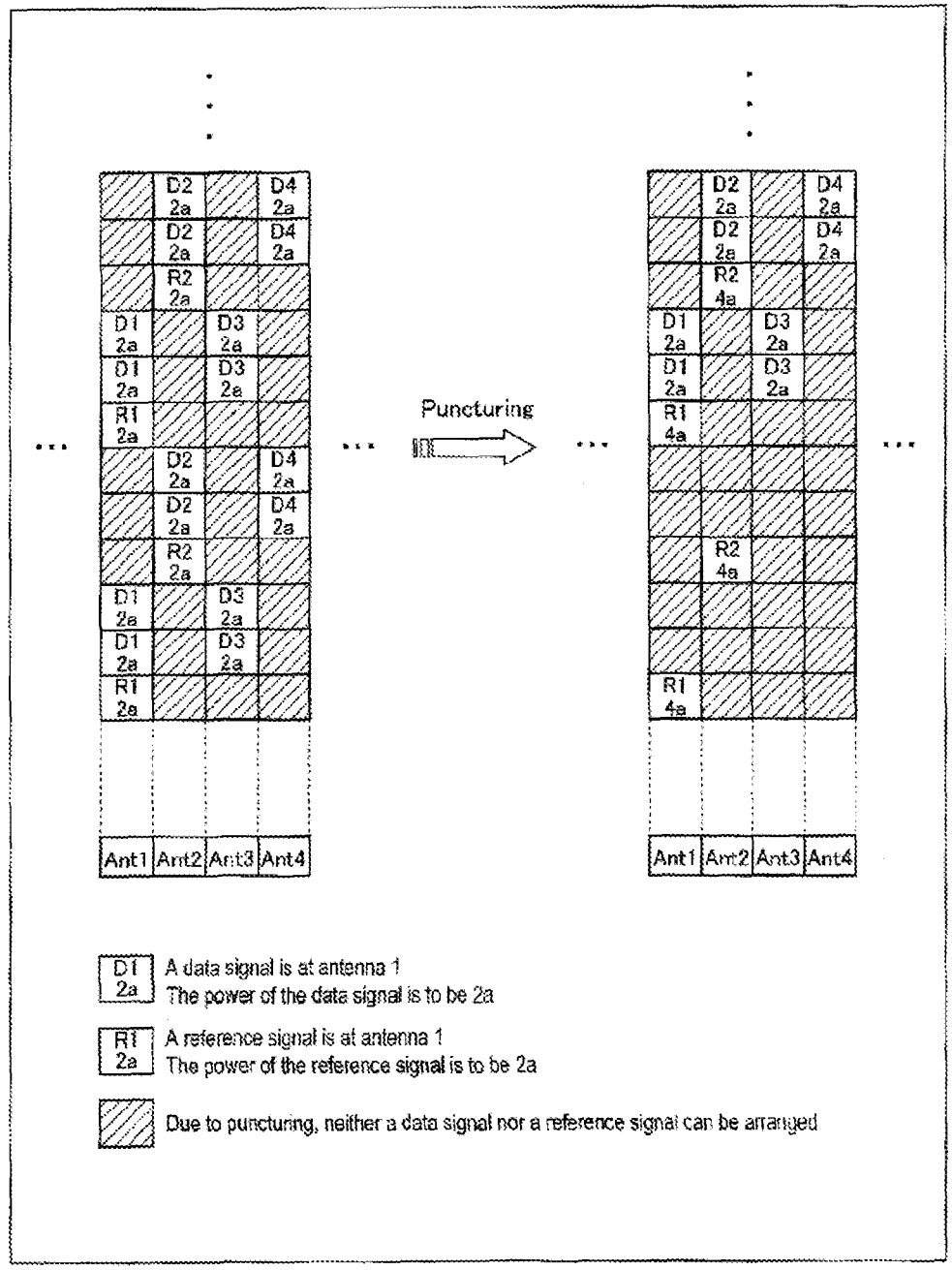
FIG. 3 is a diagram showing a method proposed in Non-Patent Document 4, wherein, at the time of SFBC (Space Freqency Block Code)+FSTD (Frequency Switched Transmit Diversity) encoding, in order to increase the power of a reference signal specific to each base station device within one OFDM symbol of a resource block, an unused subcarrier is set within the same OFDM symbol as that reference signal specific to each base station device.
Figure 4:
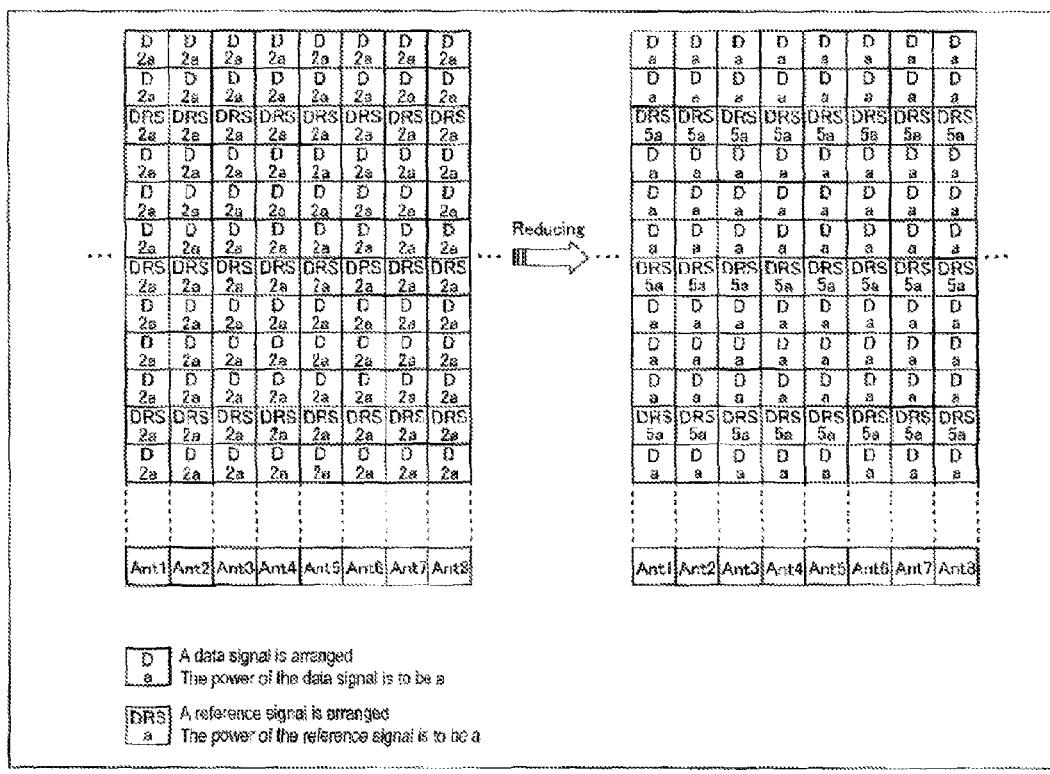
FIG. 4 is a diagram showing a method proposed in Non-Patent Document 5, wherein, in a case where communications by way of beamforming are to be performed, channel estimation accuracy is improved by increasing the power (e.g., from 2 a to 5 a, etc.) of a reference signal specific to each mobile station device.
Figure 6:
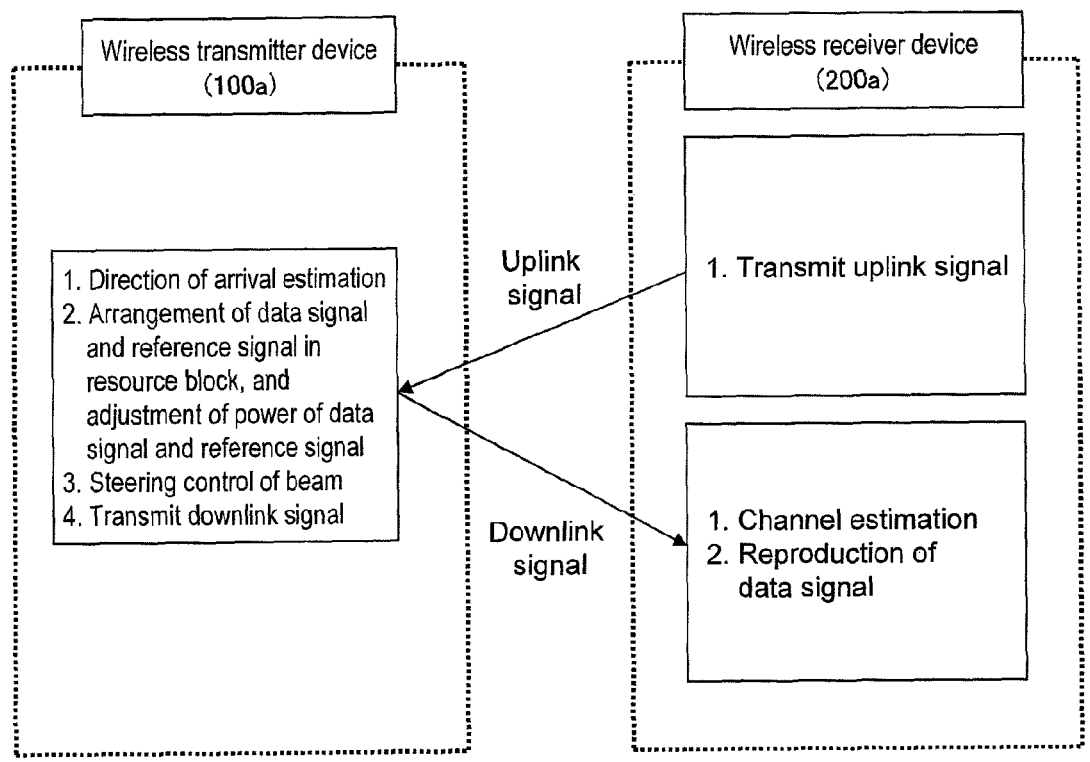
FIG. 6 is a diagram showing one configuration example of a wireless communication system according to the first embodiment of the present invention.

FIG. 6 is a diagram showing one configuration example of a wireless communication system according to the present embodiment. As shown in FIG. 6, the wireless communication system comprises a base station device ($100a$) and a mobile station device ($200a$).

Using an uplink signal transmitted by the mobile station device ($200a$), first, the base station device ($100a$) 1. estimates the direction of arrival of the uplink signal, that is, the direction in which the mobile station device is located.

Next, 2. a reference signal specific to each base station device, a reference signal specific to each mobile station device, and a data signal are arranged with respect to a resource block, and the power of the reference signal specific to each base station device, the reference signal specific to each mobile station device, and the data signal is adjusted.

Next, 3. a weight that steers a beam with respect to the estimated direction of arrival is controlled, that weight is applied to perform beam steering control, and 4. a downlink signal is transmitted to the mobile station device ($200a$).

The mobile station device ($200a$) receives the downlink signal transmitted from the base station device ($100a$), and 1. performs channel estimation using the reference signal included in the downlink signal. 2. It performs an equalization process using the estimated channel characteristics, and reproduces a data signal from the equalized signal.

Figure 7:
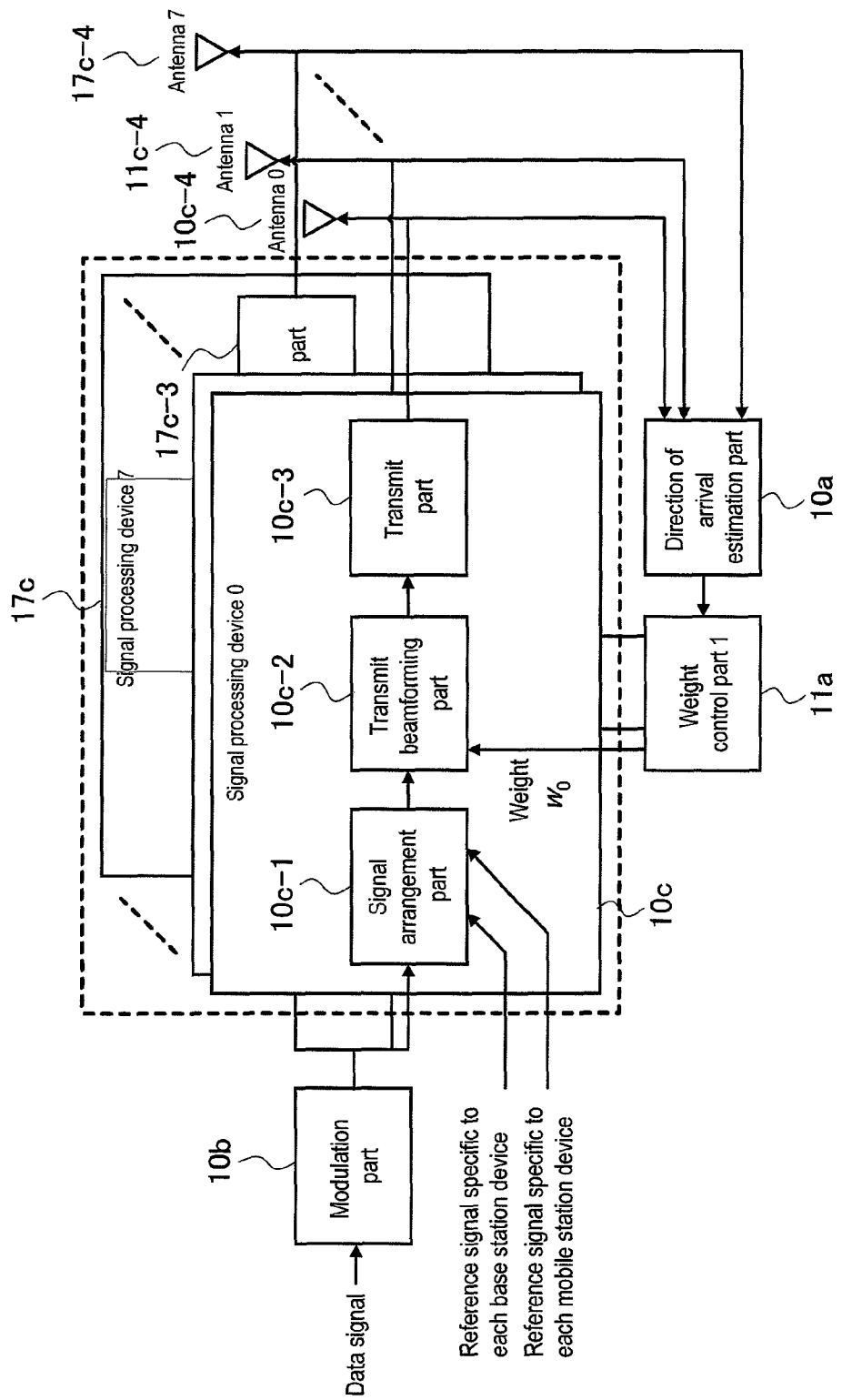
FIG. 7 is a functional block diagram showing one configuration example of a base station device.

Next, detailed configurations of the base station device ($100a$) and the mobile station device ($200a$) are described. First, a configuration of the base station device ($100a$) is described. FIG. 7 is a functional block diagram showing one configuration example of the base station device ($100a$).

As shown in FIG. 7, the base station device ($100a$) receives an uplink signal transmitted from the mobile station device ($200a$) via eight antennas, namely, antenna 0 ($10c$-$4$), antenna 1 ($11c$-$4$), antenna 2 ($12c$-$4$), antenna 3 ($13c$-$4$), antenna 4 ($14c$-$4$), antenna 5 ($15c$-$4$), antenna 6 ($16c$-$4$), and antenna 7 ($17c$-$4$). It comprises: a direction of arrival estimation part ($10a$) that estimates the direction of arrival of the uplink signal using the received uplink signal; and a weight control part 1 ($11a$) that controls a weight for steering a beam with respect to the estimated direction of arrival for each resource block to which beamforming is to be applied. It further comprises: a modulation part ($10b$) for performing quadrature amplitude modulation with respect to an externally inputted data signal; and a signal processing device 0 ($10c$), a signal processing device 1 ($11c$), a signal processing device 2 ($12c$), a signal processing device 3 ($13c$), a signal processing device 4 ($14c$), a signal processing device 5 ($15c$), a signal processing device 6 (16c) and a signal processing device 7 (17c) that perform signal processing with respect to the quadrature amplitude modulated data signal. However, since the configurations of the signal processing device 0 (10c), the signal processing device 1 (11c), the signal processing device 2 (12c), the signal processing device 3 (13c), the signal processing device 4 (14c), the signal processing device 5 (15c), the signal processing device 6 (16c) and the signal processing device 7 (17c) are identical, only the signal processing device 0 (10c) is described herein, and descriptions are omitted with respect to other processes.

The signal processing device 0 (10c) comprises: a signal arrangement part (10c-1) which, based on a signal arrangement pattern comprising information for performing the arrangement of, with respect to a resource block, a reference signal specific to each base station device, a reference signal specific to each mobile station device, and a data signal, and for performing the adjustment of the power of the reference signal specific to each base station device, the reference signal specific to each mobile station device, and the data signal, performs the arrangement of, with respect to the resource block, the reference signal specific to each base station device, the reference signal specific to each mobile station device, and the data signal, and the adjustment of the power of the reference signal specific to each base station device, the reference signal specific to each mobile station device, and the data signal; a transmit beamforming part (10c-2) that applies, with respect to the data signal and the reference signal specific to mobile station device, the weight controlled at the weight control part 1 (11a); and a transmit part (10c-3) that performs inverse fast Fourier transform, insertion of a cyclic prefix, digital/analog conversion, analog signal processing, etc., and transmits a downlink signal to the mobile station device (200a) via the antenna (10c-4).

Next, details of a process flow of the base station device (100a) are described.

The base station device (100a) is divided into two systems. One is system A, which controls the weight for performing communications by way of beamforming, and the other is system B, which performs signal processing on the externally inputted data signal.

First, a process flow of system A is described. In system A, it is assumed that an uplink signal is transmitted from the mobile station device (200a) to the base station device (100a).

The direction of arrival estimation part (10a) first receives, via the antenna 0 (10c-4), the antenna 1 (11c-4), the antenna 2 (12c-4), the antenna 3 (13c-4), the antenna 4 (14c-4), the antenna 5 (15c-4), the antenna 6 (16c-4) and the antenna 7 (17c-4), the uplink signal transmitted from the mobile station device (200a). Next, from the received uplink signal, it estimates the direction of arrival of the uplink signal, and outputs the estimated direction of arrival to the weight control part 1 (11a).

The weight control part 1 (11a) first controls, for each resource block, the weight of each antenna for steering a beam with respect to the estimated direction of arrival. Next, it outputs the weight for antenna 0 (10c-4) to the signal processing device 0 (10c), the weight for antenna 1 (11c-4) to the signal processing device 1 (11c), the weight for antenna 2 (12c-4) to the signal processing device 2 (12c), the weight for antenna 3 (13c-4) to the signal processing device 3 (13c), the weight for antenna 4 (14c-4) to the signal processing device 4 (14c), the weight for antenna 5 (15c-4) to the signal processing device 5 (15c), the weight for antenna 6 (16c-4) to the signal processing device 6 (16c), and the weight for antenna 7 (17c-4) to the signal processing device 7 (17c).

Next, a process flow of system B is described. In system B, it is assumed that a reference signal specific to each base station device, a reference signal specific to each mobile station device, and a data signal are inputted to the base station device (100a) from outside.

The modulation part (10b) performs quadrature amplitude modulation on the inputted data signal, and outputs the same signal to the signal processing device 0 (10c), the signal processing device 1 (11c), the signal processing device 2 (12c), the signal processing device 3 (13c), the signal processing device 4 (14c), the signal processing device 5 (15c), the signal processing device 6 (16c) and the signal processing device 7 (17c). For the reason mentioned above, only a flow of a process of the signal processing device 0 (10c) is described herein, and descriptions are omitted with respect to other processes.

The data signal inputted to the signal processing device 0 (10c) is inputted to the signal arrangement part (10c-1).

FIG. 8A is a diagram showing one example of a signal arrangement pattern comprising information for performing the arrangement of; with respect to a resource block, a reference signal specific to each base station device, a reference signal specific to each mobile station device and a data signal, and the adjustment of the power of the reference signal specific to each base station device, the reference signal specific to each mobile station device and the data signal.

Based on such a signal arrangement pattern as that shown in FIG. 8A, the signal arrangement part (10c-1) performs the arrangement of, with respect to the resource block, the reference signal specific to each base station device, the reference signal specific to each mobile station device and the data signal, and the adjustment of the power of the reference signal specific to each base station device, the reference signal specific to each mobile station device and the data signal. Next, this resource block is outputted to the transmit beamforming part (10c-2) as a unit of OFDM symbols.

The transmit beamforming part (10c-2) first applies, to the data signal and the reference signal specific to each mobile station device included in the OFDM symbols outputted from the signal arrangement part (10c-1), the weight outputted from the weight control part 1 (11a). Next, the weighted OFDM symbols are outputted to the transmit part (10c-3).

The transmit part (10c-3) performs inverse fast Fourier transform, insertion of a cyclic prefix, digital/analog conversion, analog signal processing, etc., and transmits a downlink signal to the mobile station device (200a) via the antenna 0 (10c-4).

Figure 9:
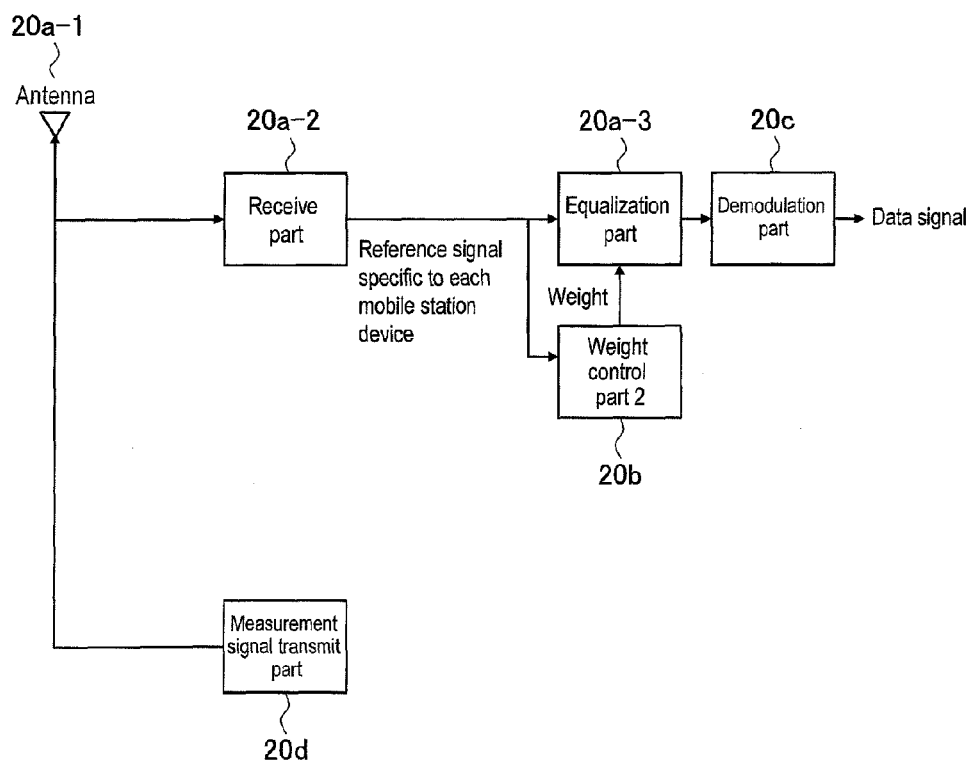
FIG. 9 is a functional block diagram showing one configuration example of a mobile station device.

Next, one configuration example of the mobile station device (200a) is described. FIG. 9 is a diagram showing one configuration example of the mobile station device (200a).

The mobile station device (200a) comprises a measurement signal transmit part (20d) that transmits, via an antenna (20a-1), an uplink signal that the base station device (100a) uses to steer a beam with respect to the mobile station device (200a). It further comprises: a receive part (20a-2) that receives, via the antenna (20a-1), a downlink signal transmitted from the base station device (100a); an equalization part (20a-3) that performs an equalization process; a demodulation part (20c) that performs quadrature amplitude demodulation; and a weight control part 2 (20b) that controls, from a reference signal specific to each mobile station device that is outputted from the receive part (20a-2), a weight that is used in the equalization process.

Next, details of a process flow of the mobile station device (200a) are described.

The mobile station device (200a) is divided into two systems. One is system A, which transmits an uplink signal that the base station device (100*a*) uses to steer a beam with respect to the mobile station device (200*a*), and the other is system B, which receives a downlink signal transmitted from the base station device (100*a*) and reproduces a data signal through signal processing.

First, a process flow of system A is described.

The measurement signal transmit part (20*d*) transmits, via the antenna (20*a*-1), an uplink signal that the base station device (100*a*) uses to steer a beam with respect to the direction in which the mobile station device (200*a*) is located.

Next, a process flow of system B is described. In system B, it is assumed that a downlink signal is transmitted from the base station device (100*a*) to the mobile station device (200*a*).

The receive part (20*a*-2) first receives, via the antenna (20*a*-1), the downlink signal transmitted from the base station device (100*a*). Next, analog signal processing, analog/digital conversion, removal of a cyclic prefix, fast Fourier transform, etc., are performed on the received downlink signal, a data signal is outputted to the equalization part (20*a*-3), and a reference signal specific to each mobile station device is outputted to the weight control part 2 (20*b*).

The weight control part 2 (20*b*) performs channel estimation using the inputted reference signal specific to each mobile station device, controls a weight to be used in the equalization process of the equalization part (20*a*-3), and outputs that weight to the equalization part (20*a*-3).

The equalization part (20*a*-3) performs equalization by applying the inputted weight to the inputted data signal, and outputs this equalized data signal to the demodulation part (20*c*).

The demodulation part (20*c*) performs quadrature amplitude demodulation on the inputted data signal, and outputs the demodulated data signal to the outside.

With the present embodiment, it is possible to overcome problems associated with the mixing of a reference signal specific to each base station device and a reference signal specific to each mobile station device within one OFDM symbol of a resource block.

Figure 8B:
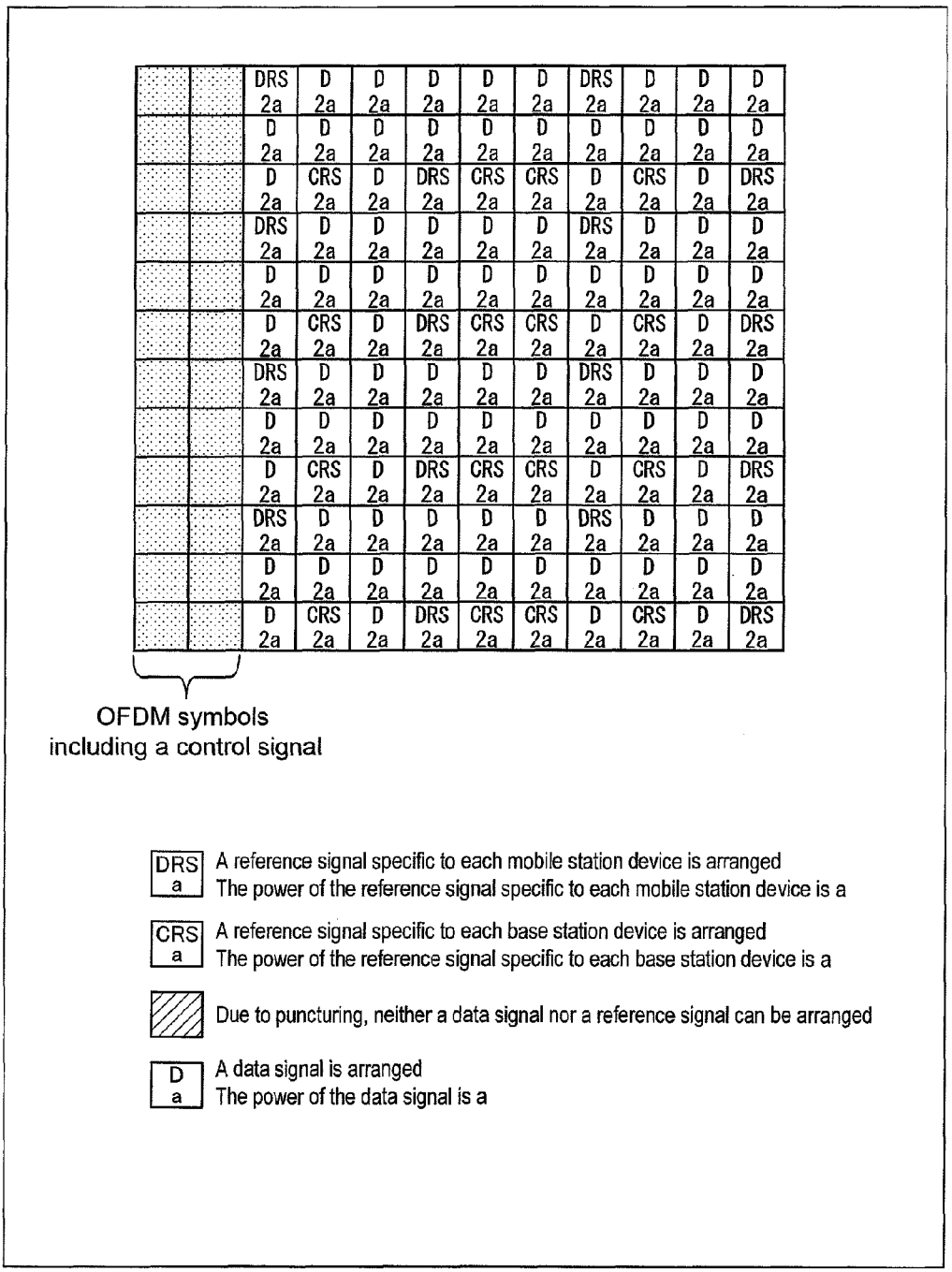
FIG. 8B is a diagram showing one example of a signal arrangement pattern according to the present embodiment.

In addition, although a description has been provided above taking the signal arrangement pattern in FIG. 8A as an example, the signal arrangement pattern in FIG. 8B may be used instead. With the signal arrangement pattern in FIG. 8B, there is a characteristic wherein, when channel estimation is performed using the reference signal specific to each mobile station device, accuracy is improved as compared to when the signal arrangement pattern shown in FIG. 8A is used. On the other hand, there is a concern that throughput may drop as the number of reference signals specific to each mobile station device increases.

Second Embodiment

Next, a communication technique according to the second embodiment of the present invention is described. A communication system according to the present embodiment is described taking as an example a case where a base station device comprises eight antennas that are used for communications by way of beamforming and four antennas that are used for the transmission of a reference signal specific to each base station device, and where a mobile station (terminal station) device comprises one antenna.

In the present embodiment, when the mobile station device (200*a*) receives a downlink signal transmitted from the base station device (100*a*), power is adjusted in such a manner that the power of the OFDM symbols would all be the same. Thus, it is possible to reduce the load with respect to the analog signal processing of the mobile station device (200*a*).

FIG. 8A is a diagram showing one example of a signal arrangement pattern of a resource block according to the present embodiment. As shown in FIG. 8A, in the second embodiment, a reference signal specific to each base station device and a reference signal specific to each mobile station device are not contained within one OFDM symbol of the resource block. OFDM symbols including the reference signal specific to each mobile station device are arranged at regular intervals on a time axis. By using such a signal arrangement pattern, problems caused by the mixing of the reference signal specific to each base station device and the reference signal specific to each mobile station device within one OFDM symbol of the resource block as indicated in Non-Patent Document 1 mentioned above are overcome, while at the same time suppressing channel estimation degradation that occurs when the mobile station is moving at high speed.

FIG. 6 is a diagram showing one configuration example of a wireless communication system according to the present embodiment. As shown in FIG. 6, the wireless communication system comprises the base station device (100*a*) and the mobile station device (200*b*).

Using an uplink signal transmitted by the mobile station device (200*a*), first, the base station device (100*a*) 1. estimates the direction of arrival of the uplink signal, that is, the direction in which the mobile station device is located.

Next, 2. a reference signal specific to each base station device, a reference signal specific to each mobile station device, and a data signal are arranged with respect to a resource block, and the power of the reference signal specific to each base station device, the reference signal specific to each mobile station device, and the data signal is adjusted.

Next, 3. a weight that steers a beam with respect to the estimated direction of arrival is controlled, that weight is applied to perform beam steering control, and 4. a downlink signal is transmitted to the mobile station device (200*a*).

The mobile station device (200*a*) receives the downlink signal transmitted from the base station device (100*a*), and 1. performs channel estimation using the reference signal included in the downlink signal. 2. It performs an equalization process using the estimated channel characteristics, and reproduces a data signal from the equalized signal.

Figure 15:
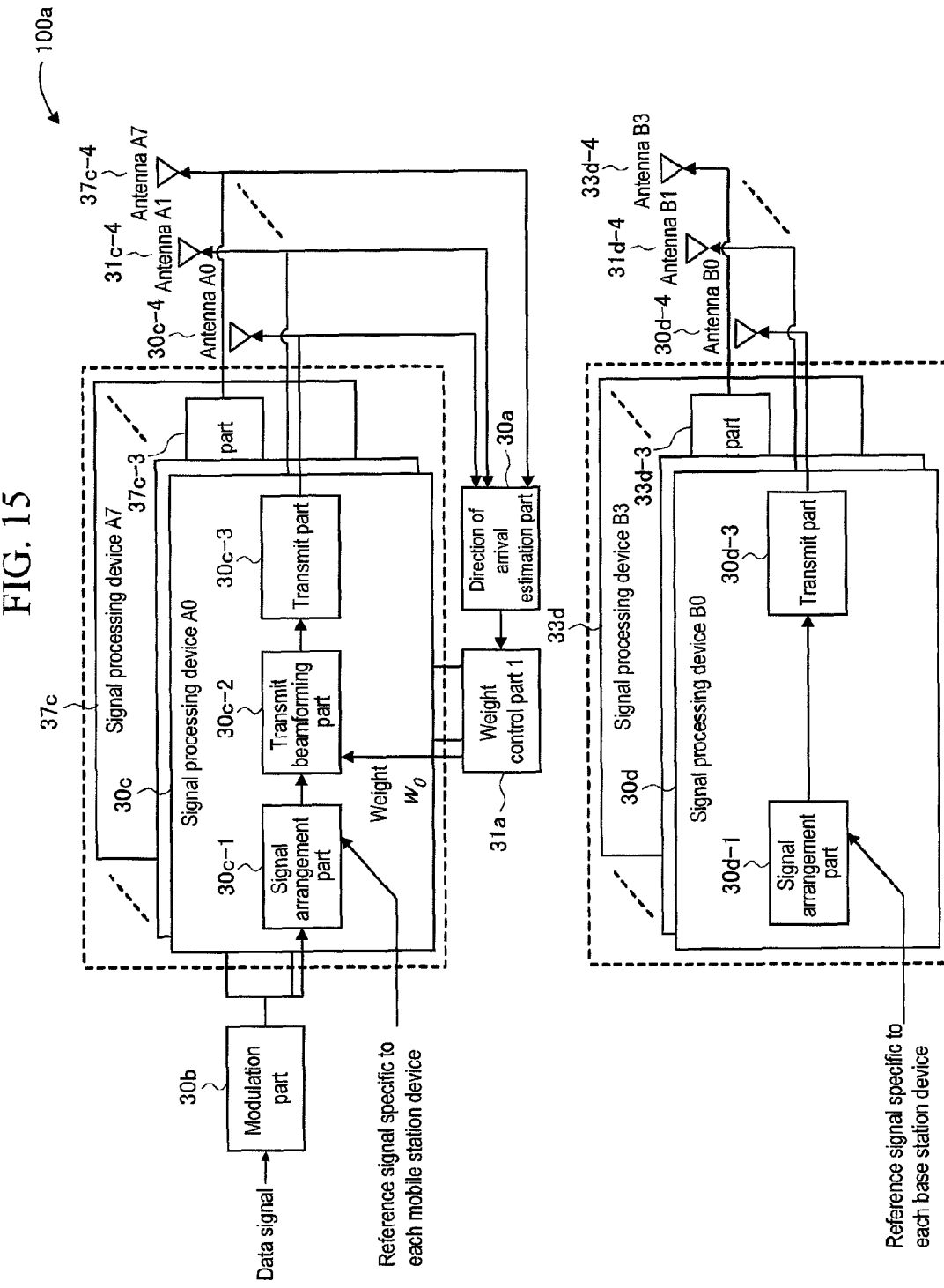
FIG. 15 is a functional block diagram showing one configuration example of a base station device according to the second embodiment of the present invention.

Next, detailed configurations of the base station device (100*a*) and the mobile station device (200*a*) are described. First, a configuration of the base station device (100*a*) is described. FIG. 15 is a functional block diagram showing one configuration example of the base station device (100*a*).

As shown in FIG. 15, the base station device (100*a*) receives, via eight antennas, namely, antenna A0 (30*c*-4), antenna A1 (31*c*-4), antenna A2 (32*c*-4), antenna A3 (33*c*-4), antenna A4 (34*c*-4), antenna A5 (35*c*-4), antenna A6 (36*c*-4) and antenna A7 (37*c*-4), an uplink signal transmitted from the mobile station device (200*a*). It comprises: a direction of arrival estimation part (30*a*) that estimates the direction of arrival of the uplink signal using the received uplink signal; and a weight control part 1 (31*a*) that controls a weight for steering a beam with respect to the estimated direction of arrival for each resource block to which beamforming is to be applied. It further comprises: a modulation part (30*b*) for performing quadrature amplitude modulation with respect to an externally inputted data signal; and a signal processing device A0 (30*c*), a signal processing device A1 (31*c*), a signal processing device A2 (32*c*), a signal processing device A3 (33*c*), a signal processing device A4 (34*c*), a signal processing device A5 (35*c*), a signal processing device A6 (36*c*) and a signal processing device A7 (37*c*) that perform signal processing with respect to the quadrature amplitude modulated data signal. However, since the configurations of the signal processing device A0 (30c), the signal processing device A1 (31c), the signal processing device A2 (32c), the signal processing device A3 (33c), the signal processing device A4 (34c), the signal processing device A5 (35c), the signal processing device A6 (36c) and the signal processing device A7 (37c) are identical, only the signal processing device A0 (30c) is described herein, and descriptions are omitted with respect to other processes.

The base station device (100a) further comprises a signal processing device B0 (30d), a signal processing device B1 (31d), a signal processing device B2 (32d) and a signal processing device B3 (33d), which perform signal processing with respect to the reference signal specific to each base station device. However, since the configurations of the signal processing device B0 (30d), the signal processing device B1 (31d), the signal processing device B2 (32d) and the signal processing device B3 (33d) are identical, only the signal processing device B0 (30d) is described herein, and descriptions are omitted with respect to other processes.

The signal processing device A0 (30c) comprises: a signal arrangement part (30c-1) which, based on a signal arrangement pattern comprising information for performing the arrangement of, with respect to a resource block, a reference signal specific to each base station device, a reference signal specific to each mobile station device, and a data signal, and for performing the adjustment of the power of the reference signal specific to each base station device, the reference signal specific to each mobile station device, and the data signal, performs the arrangement of with respect to the resource block, the reference signal specific to each mobile station device, and the data signal, and the adjustment of the power of the reference signal specific to each mobile station device, and the data signal; a transmit beamforming part (30c-2) that applies, with respect to the data signal and the reference signal specific to mobile station device, the weight controlled at the weight control part 1 (31a); and a transmit part (30c-3) that performs inverse fast Fourier transform, insertion of a cyclic prefix, digital/analog conversion, analog signal processing, etc., and transmits a downlink signal to the mobile station device (200a) via the antenna A0 (30c-4).

The signal processing device B0 (30d) comprises: a signal arrangement part (30d-1) that performs, based on the signal arrangement pattern, the arrangement of, with respect to the resource block, the reference signal specific to each base station device, and the adjustment of the power of the reference signal specific to each base station device; and a transmit part (30d-3) that performs inverse fast Fourier transform, insertion of a cyclic prefix, digital/analog conversion, analog signal processing, etc., and transmits a downlink signal to the mobile station device (200a) via the antenna B0 (30d-4).

Next, details of a process flow of the base station device (100a) are described.

The base station device (100a) is divided into three systems. One is system A, which controls the weight for performing communications by way of beamforming, another is system B, which performs signal processing on an externally inputted data signal, and another is system C, which performs signal processing on the reference signal specific to each base station device.

First, a process flow of system A is described. In system A, it is assumed that an uplink signal is transmitted from the mobile station device (200a) to the base station device (100a).

The direction of arrival estimation part (30a) first receives, via the antenna A0 (30c-4), the antenna A1 (31c-4), the antenna A2 (32c-4), the antenna A3 (33c-4), the antenna A4 (34c-4), the antenna A5 (35c-4), the antenna A6 (36c-4) and the antenna A7 (37c-4), the uplink signal transmitted from the mobile station device (200a). Next, from the received uplink signal, it estimates the direction of arrival of the uplink signal, and outputs the estimated direction of arrival to the weight control part 1 (31a).

The weight control part 1 (31a) first controls, for each resource block, the weight of each antenna for steering a beam with respect to the estimated direction of arrival. Next, it outputs the weight for antenna A0 (30c-4) to the signal processing device A0 (30c), the weight for antenna A1 (31c-4) to the signal processing device A1 (31c), the weight for antenna A2 (32c-4) to the signal processing device A2 (32c), the weight for antenna A3 (33c-4) to the signal processing device A3 (33c), the weight for antenna A4 (34c-4) to the signal processing device A4 (34c), the weight for antenna A5 (35c-4) to the signal processing device A5 (35c), the weight for antenna A6 (36c-4) to the signal processing device A6 (36c), and the weight for antenna A7 (37c-4) to the signal processing device A7 (37c).

Next, a process flow of system B is described. In system B, it is assumed that a reference signal specific to each mobile station device and a data signal are inputted to the base station device (100a) from outside.

The modulation part (30b) performs quadrature amplitude modulation on the inputted data signal, and outputs the same signal to the signal processing device A0 (30c), the signal processing device A1 (31c), the signal processing device A2 (32c), the signal processing device A3 (33c), the signal processing device A4 (34c), the signal processing device A5 (35c), the signal processing device A6 (36c) and the signal processing device A7 (37c). For the reason mentioned above, only a flow of a process of the signal processing device A0 (30c) is described herein, and descriptions are omitted with respect to other processes.

The data signal inputted to the signal processing device A0 (30c) is inputted to the signal arrangement part (30c-1).

FIG. 8A is a diagram showing one example of a signal arrangement pattern comprising information for performing the arrangement of, with respect to a resource block, a reference signal specific to each base station device, a reference signal specific to each mobile station device and a data signal, and the adjustment of the power of the reference signal specific to each base station device, the reference signal specific to each mobile station device and the data signal.

Based on such a signal arrangement pattern as that shown in FIG. 8A, the signal arrangement part A0 (30c-1) performs the arrangement of, with respect to the resource block, the reference signal specific to each mobile station device and the data signal, and the adjustment of the power of the reference signal specific to each mobile station device and the data signal. Next, this resource block is outputted to the transmit beamforming part (30c-2) as a unit of OFDM symbols.

The transmit beamforming part (30c-2) first applies, to the data signal and the reference signal specific to each mobile station device included in the OFDM symbols outputted from the signal arrangement part (30c-1), the weight outputted from the weight control part 1 (31a). Next, the weighted OFDM symbols are outputted to the transmit part (30c-3).

The transmit part (30c-3) performs inverse fast Fourier transform, insertion of a cyclic prefix, digital/analog conversion, analog signal processing, etc., and transmits a downlink signal to the mobile station device (200a) via the antenna A0 (30c-4).

Next, a process flow of system C is described. In system C, it is assumed that a reference signal specific to each base station device is inputted to the base station device (100a) from outside.

The reference signal specific to each base station device is first inputted to the signal processing device B0 (30d), the signal processing device B1 (31d), the signal processing device B2 (32d) and the signal processing device B3 (33d). For the reason mentioned above, only the signal processing device B0 (30d) is described herein, and descriptions are omitted with respect to other processes.

The reference signal specific to each base station device that is inputted to the signal processing device B0 (30d) is first outputted to the signal arrangement part (30d-1). Based on such a signal arrangement pattern as that shown in FIG. 8A, the signal arrangement part (30d-1) performs the arrangement of, with respect to the resource block, the reference signal specific to each base station device, and the adjustment of the power of the reference signal specific to each base station device. Next, this resource block is outputted to the transmit part (30d-3) as a unit of OFDM symbols.

The transmit part (30d-3) performs inverse fast Fourier transform, insertion of a cyclic prefix, digital/analog conversion, analog signal processing, etc., and transmits a downlink signal to the mobile station device (200a) via the antenna B0 (30d-4).

Next, one configuration example of the mobile station device (200a) is described. FIG. 9 is a diagram showing one configuration example of the mobile station device (200a).

The mobile station device (200a) comprises the measurement signal transmit part (20d) that transmits, via the antenna (20a-1), an uplink signal that the base station device (100a) uses to steer a beam with respect to the mobile station device (200a). It further comprises: the receive part (20a-2) that receives, via the antenna (20a-1), a downlink signal transmitted from the base station device (100a); the equalization part (20a-3) that performs an equalization process; the demodulation part (20c) that performs quadrature amplitude demodulation; and the weight control part 2 (20b) that controls, from a reference signal specific to each mobile station device that is outputted from the receive part (20a-2), a weight that is used in the equalization process.

Next, details of a process flow of the mobile station device (200a) are described.

The mobile station device (200a) is divided into two systems. One is system A, which transmits an uplink signal that the base station device (100a) uses to steer a beam with respect to the mobile station device (200a), and the other is system B, which receives the downlink signal transmitted from the base station device (100a) and reproduces a data signal through signal processing.

First, a process flow of system A is described.

The measurement signal transmit part (20d) transmits, via the antenna (20a-1), an uplink signal that the base station device (100a) uses to steer a beam with respect to the direction in which the mobile station device (200a) is located.

Next, a process flow of system B is described. In system B, it is assumed that a downlink signal is transmitted from the base station device (100a) to the mobile station device (200a).

The receive part (20a-2) first receives, via the antenna (20a-1), the downlink signal transmitted from the base station device (100a). Next, analog signal processing, analog/digital conversion, removal of a cyclic prefix, fast Fourier transform, etc., are performed on the received downlink signal, a data signal is outputted to the equalization part (20a-3), and a reference signal specific to each mobile station device is outputted to the weight control part 2 (20b).

The weight control part 2 (20b) performs channel estimation using the inputted reference signal specific to each mobile station device, controls a weight to be used in the equalization process of the equalization part (20a-3), and outputs that weight to the equalization part (20a-3).

The equalization part (20a-3) performs equalization by applying the inputted weight to the inputted data signal, and outputs this equalized data signal to the demodulation part (20c).

The demodulation part (20c) performs quadrature amplitude demodulation on the inputted data signal, and outputs the demodulated data signal to the outside.

With the present embodiment, it is possible to overcome problems associated with the containing of a reference signal specific to each base station device and a reference signal specific to each mobile station device within one OFDM symbol of a resource block.

In addition, although a description has been provided above taking the signal arrangement pattern in FIG. 8A as an example, the signal arrangement pattern in FIG. 8B may be used instead. With the signal arrangement pattern in FIG. 8B, there is a characteristic wherein, when channel estimation is performed using the reference signal specific to each mobile station device, accuracy is improved as compared to when the signal arrangement pattern shown in FIG. 8A is used. On the other hand, there is a concern that throughput may drop as the number of reference signals specific to each mobile station device increases.

Third Embodiment

Figure 10:
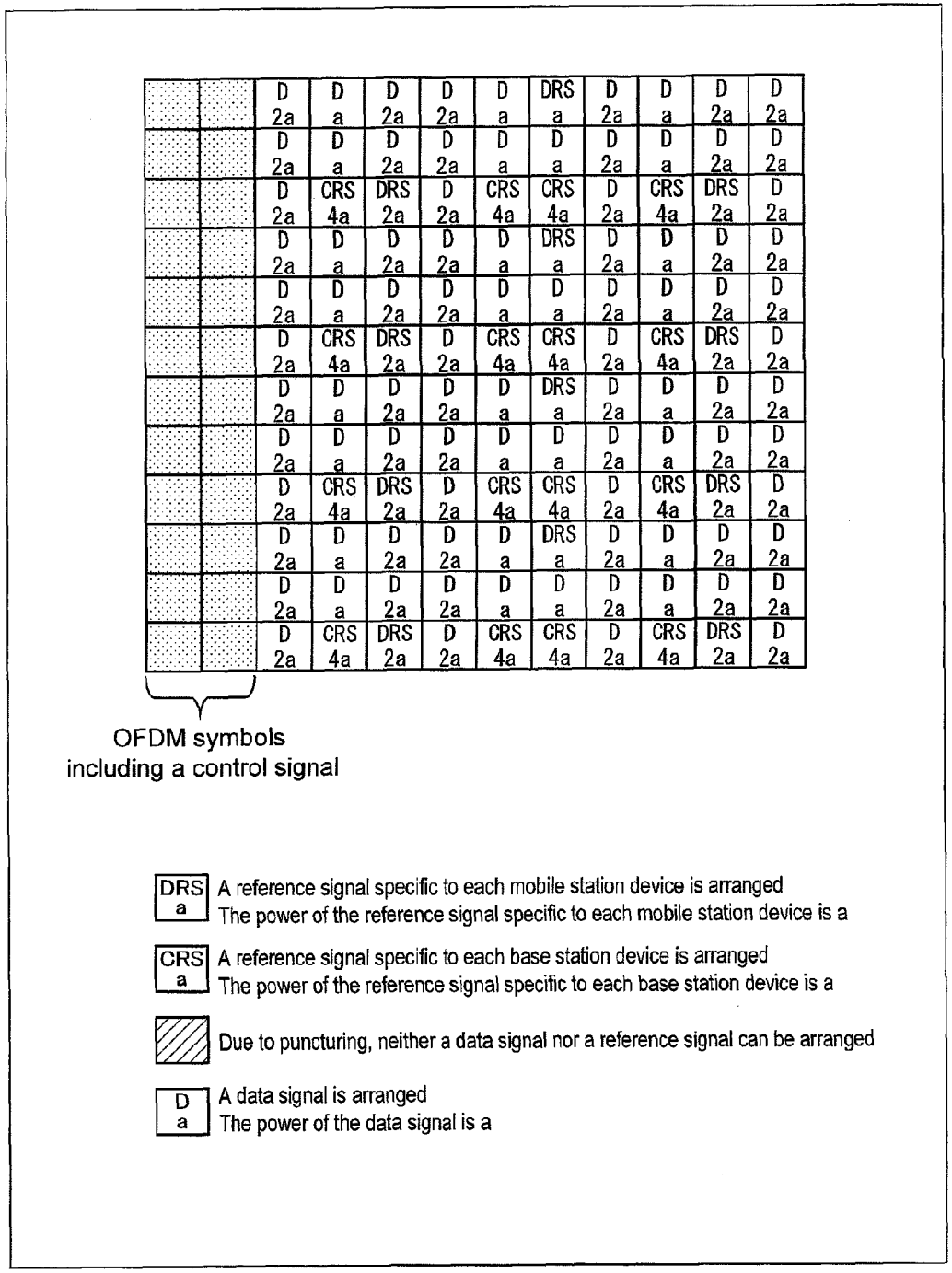
FIG. 10 is a diagram showing one example of a signal arrangement pattern according to the third embodiment of the present invention.

A communication technique according to the third embodiment of the present invention is described below. In the present embodiment, as shown in FIG. 10, in order to improve cell coverage, cell edge throughput, etc., the power of the data signal is decreased, and using the power corresponding to that decrease, the power of the reference signal specific to each base station device is increased. However, the power of a reference signal specific to each mobile station device is made equal to the power of the data signal within the OFDM symbol in which that reference signal specific to each mobile station device is included.

By using such a signal arrangement pattern as that shown in FIG. 10, it is possible to suppress the phenomenon whereby the power of the data signal within an OFDM symbol becomes unnecessarily low when the power of the reference signal specific to each base station device is increased.

In the present embodiment, based on such a signal arrangement pattern as that shown in FIG. 10, the arrangement of the reference signal specific to each base station device, the arrangement of the reference signal specific to each mobile station device, the arrangement of the data signal, the adjustment of the power of the reference signal specific to each base station device, the adjustment of the power of the reference signal specific to each mobile station device, and the adjustment of the power of the data signal are performed. It is otherwise the same as the cases of the first embodiment and the second embodiment. According to the present embodiment, since the power of the data signal does not become unnecessarily low, it is possible to increase the reproduction accuracy for the data signal.

Fourth Embodiment

Next, the fourth embodiment of the present invention is described. As shown in FIG. 11, in order to improve cell coverage, cell edge throughput, etc., the power of the data signal is decreased, and using the power corresponding to that decrease, the power of the reference signal specific to each base station device is increased. However, as indicated in Non-Patent Document 2 mentioned above, the power of the reference signal specific to each mobile station device and the power of the data signal within an OFDM symbol not including the reference signal specific to each base station device are made equal.

By using such a signal arrangement pattern as that shown in FIG. 11, as indicated in Non-Patent Document 5 mentioned above, channel characteristics are improved since, in an OFDM symbol in which the reference signal specific to each base station device and the reference signal specific to each mobile station device are mixed, the power of the reference signal specific to each mobile station device becomes greater than the power of the data signal. Thus, it is possible to improve the reproduction quality of the data signal within this OFDM symbol and whose power is decreased.

In the present embodiment, based on such a signal arrangement pattern as that shown in FIG. 11, the arrangement of, with respect to the resource block, the reference signal specific to each base station device, the reference signal specific to each mobile station device and the data signal, and the adjustment of the power of the reference signal specific to each base station device, the reference signal specific to each mobile station device and the data signal are performed. It is otherwise the same as the cases of the first embodiment and the second embodiment. According to the present embodiment, decreasing the power of the data signal more than is necessary is tolerated, and it is possible to increase the reproduction accuracy for the data signal within an OFDM symbol in which the reference signal specific to each base station device and the reference signal specific to each mobile station device are contained.

Fifth Embodiment

Figure 12:
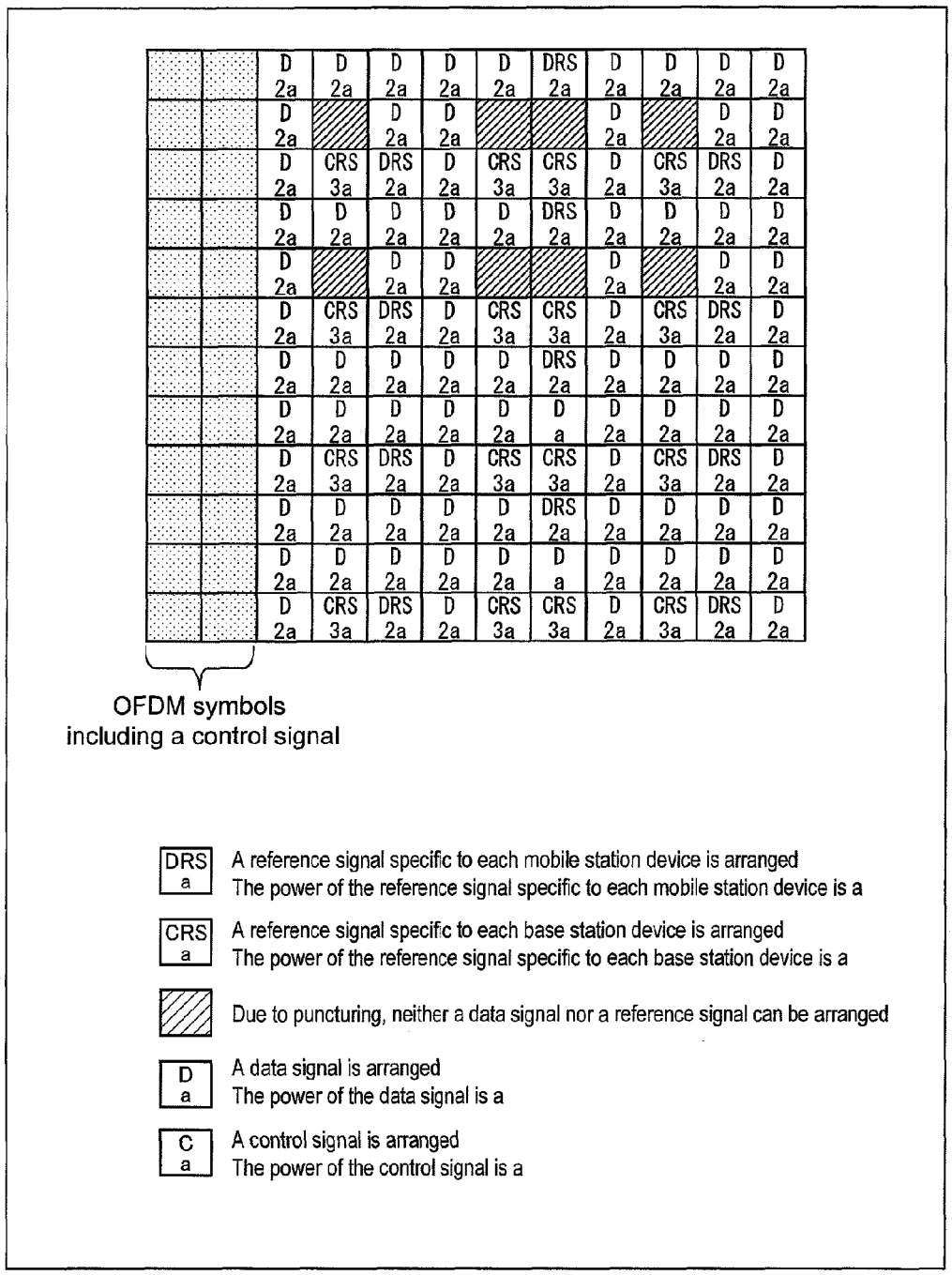
FIG. 12 is a diagram showing one example of a signal arrangement pattern according to the fifth embodiment of the present invention.

Next, the fifth embodiment of the present invention is described. As shown in FIG. 12, in order to improve cell coverage, cell edge throughput, etc., unused resource elements are set, and the power of the reference signal specific to each base station device is increased using the power allocated to those unused resource elements.

By using such a signal arrangement pattern as that shown in FIG. 12, it is possible to suppress the phenomenon whereby the power of the data signal within an OFDM symbol in which only the reference signal specific to each base station device is included becomes unnecessarily low when the power of the reference signal specific to each base station device is increased.

In addition, since the power of the data signal does not decrease, it does not affect the reproduction quality of the data signal.

In the present embodiment, based on such a signal arrangement pattern as that shown in FIG. 12, the arrangement of, with respect to the resource block, the reference signal specific to each base station device, the reference signal specific to each mobile station device and the data signal, and the adjustment of the power of the reference signal specific to each base station device, the reference signal specific to each mobile station device and the data signal are performed. It is otherwise the same as the cases of the first embodiment and the second embodiment.

Sixth Embodiment

Next, a communication technique according to the sixth embodiment of the present invention is described. In the present embodiment, the power adjustment method differs between an OFDM symbol in which the reference signal specific to each base station device and the reference signal specific to each mobile station device are mixed, and other OFDM symbols.

Figure 13:
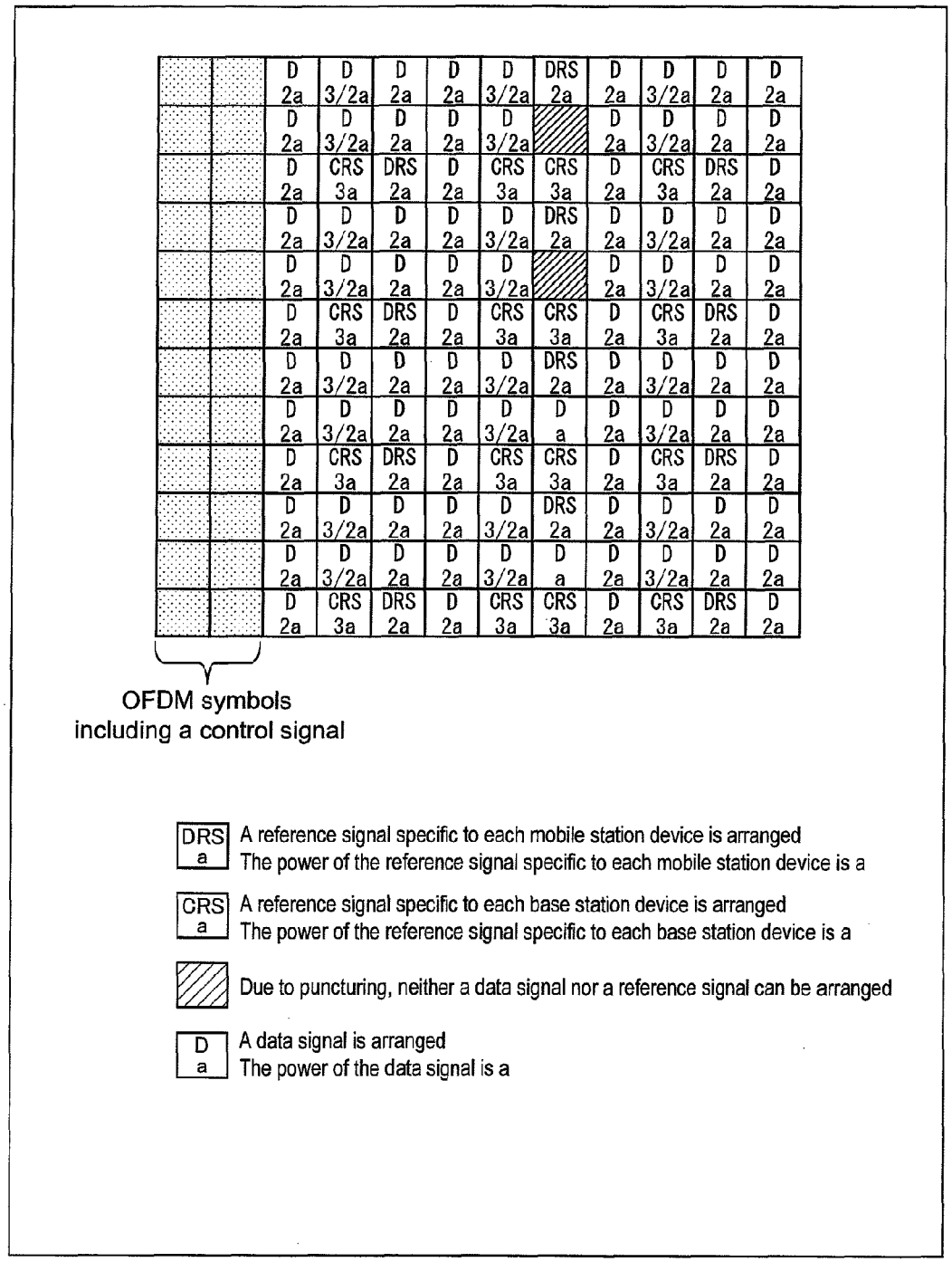
FIG. 13 is a diagram showing one example of a signal arrangement pattern according to the sixth embodiment of the present invention.
Figure 14:
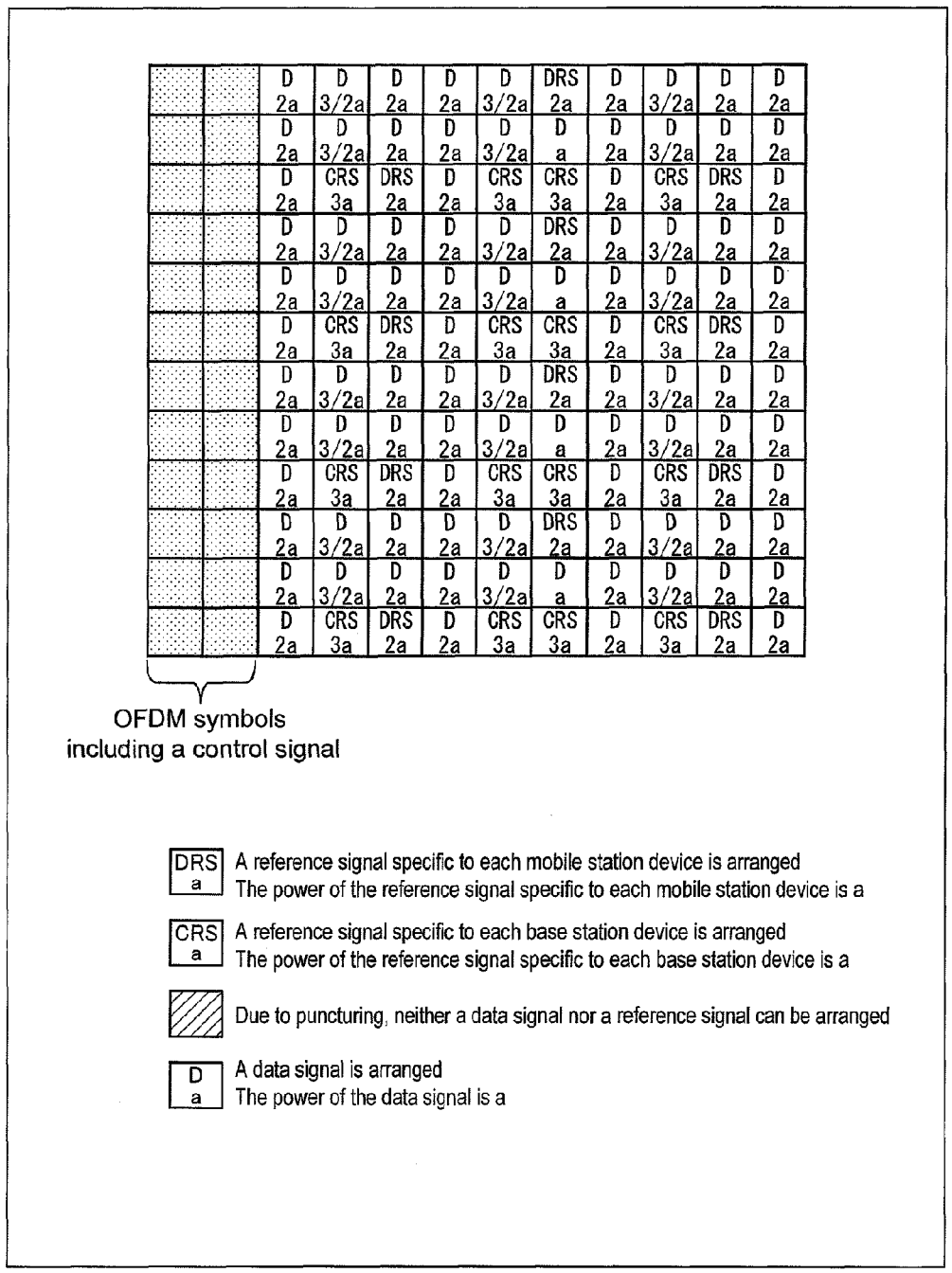
FIG. 14 is a diagram showing another example of a signal arrangement pattern according to the sixth embodiment of the present invention.

FIG. 13 and FIG. 14 are diagrams showing examples of signal arrangement patterns according to the present embodiment.

In FIG. 13, in order to improve cell coverage, cell edge throughput, etc., in an OFDM symbol in which the reference signal specific to each base station device and the reference signal specific to each mobile station device are mixed, unused resource elements are set, and the power of the reference signal specific to each base station device is increased using the power allocated to those unused resource elements. With respect to the other OFDM symbols, the power of the data signal is decreased, and the power of the reference signal specific to each base station device is increased using the power corresponding to that decrease.

In FIG. 14, in order to improve cell coverage, cell edge throughput, etc., the power of the data signal is decreased, and the power of the reference signal specific to each base station device is increased using the power corresponding to that decrease. However, it is assumed that the power of the reference signal specific to each mobile station device is uniform within the resource block. In this case, the power of the data signal within an OFDM symbol in which the reference signal specific to each base station device and the reference signal specific to each mobile station device are mixed differs from the power of the data signal within the other OFDM symbols.

By using such signal arrangement patterns as those shown in FIG. 13 and FIG. 14, and making power adjustment distinct between an OFDM symbol in which the reference signal specific to each base station device and the reference signal specific to each mobile station device are mixed and the other OFDM symbols, it is possible to suppress the phenomenon whereby the power of the data signal within an OFDM symbol in which the reference signal specific to each base station device is included becomes unnecessarily low.

In the present embodiment, based on such signal arrangement patterns as those shown in FIG. 13 and FIG. 14, the arrangement of, with respect to the resource block, the reference signal specific to each base station device, the reference signal specific to each mobile station device and the data signal, and the adjustment of the power of the reference signal specific to each base station device, the reference signal specific to each mobile station device and the data signal are performed. It is otherwise the same as the cases of the first embodiment and the second embodiment.

Seventh Embodiment

A communication technique according to the seventh embodiment of the present invention is described below. In the present embodiment, as shown in FIG. 10, in order to improve cell coverage, cell edge throughput, etc., the power of the data signal is decreased, and the power of the reference signal specific to each base station device is increased using the power corresponding to that decrease. However, the power of the reference signal specific to each mobile station device is made equal to the power of the data signal within an OFDM symbol in which the reference signal specific to each base station device is included.

By using such a signal arrangement pattern as that shown in FIG. 10, it is possible to suppress the phenomenon whereby the power of the data signal within an OFDM symbol in which only the reference signal specific to each base station device is included becomes unnecessarily low when the power of the reference signal specific to each base station device is increased.

In the present embodiment, based on such a signal arrangement pattern as that shown in FIG. 10, the arrangement of the reference signal specific to each base station device, the arrangement of the reference signal specific to each mobile station device, the arrangement of the data signal, the adjustment of the power of the reference signal specific to each base station device, the adjustment of the power of the reference signal specific to each mobile station device, and the adjustment of the power of the data signal are performed. It is otherwise the same as the cases of the first embodiment and the second embodiment According to the present embodiment, since the power of the data signal does not become unnecessarily low, it is possible to increase the reproduction accuracy for the data signal.

Thus, with respect to communication techniques according to embodiments of the present invention, the first through seventh embodiments have been presented by way of example, and a plurality of signal arrangement patterns have been presented with respect to these embodiments. However, the signal arrangement patterns presented in the embodiments are examples. Signal arrangement patterns similar thereto are also included within the scope of the present invention.

In addition, specific configurations are by no means limited to the embodiments described above, and it goes without saying that cases of design modifications made within a scope that does not depart from the spirit of the present invention are included within the scope of the claims.

In addition, with respect to the configurations, etc., shown in the appended drawings with respect to the embodiments mentioned above, they are by no means limited thereto, and may be modified as deemed appropriate within a scope in which the effects of the present invention are produced. In addition, the present invention may be practiced with modifications as deemed appropriate insofar as it does not depart the scope of the objects of the present invention.

In addition, a program for realizing the functions described in the present embodiments may be recorded on a computer-readable recording medium, this program recorded on the recording medium may be loaded on a computer system and executed to perform the processes of the various parts. It is noted that the term "computer system" as used herein is to include OS's and such hardware as peripheral devices, etc.

In addition, the term "computer system" is to include homepage providing environments (or displaying environments) in cases where the WWW system is used.

In addition, the term "computer-readable recording medium" refers to a portable medium, such as a flexible disk, a magneto-optical disk, ROM, CD-ROM, etc., and to a storage device, such as a hard disk, etc., built into a computer system. Further, the term "computer-readable recording medium" is to include one that holds a program dynamically for a short period of time, as in a communication line in a case where a program is transmitted via a network, such as the Internet, etc., or via a communication line, such as a telephone line, etc., and one that holds a program for a given period of time, as in a volatile memory inside a computer system that serves as a server or client in that case. In addition, the program mentioned above may be one that is for realizing a portion of the functions discussed above or, further, it may be one that realizes the functions mentioned above in combination with a program already recorded on a computer system. The program may also be one that is obtained via a transmission medium, such as the Internet, etc.

INDUSTRIAL APPLICABILITY

The present invention is applicable to communication devices.

The invention claimed is:

1. A method of communication in a network that includes a base station and a mobile station, the method comprising:
   allocating data, a reference signal specific to said base station, or a reference signal specific to the mobile station onto a first domain defined by frequency and time;
   allocating a plurality of first domains in a frequency direction, said allocation of said plurality of first domains representing a second domain;
   allocating a plurality of second domains placed in a time direction, said allocation of said plurality of second domains representing a third domain, wherein the third domain has at least one second domain including more than one first domain having the reference signal specific to said base station while not having the reference signal specific to the mobile station, and a plurality of other second domains including more than one first domain having the reference signal specific to the mobile station while not having the reference signal specific to the base station, wherein the plurality of other second domains are arranged at an equal interval in said time direction;
   controlling transmittal powers for each of the first domains having the data or the reference signal specific to the base station or the reference signal specific to the mobile station in said third domain, wherein in said second domain:
      the transmittal powers for the first domains having the reference signal specific to the base station are increased by decreasing a part of the transmittal powers for the first domains having the data, and
      the transmittal powers for the first domains having the reference signal specific to the base station are different from the transmittal powers for the first domains having the reference signal specific to the mobile station, and in each of said at least one second domain and said plurality of other second domains, ratios of the transmit power between any of the first domains having the data and any of the first domains having the reference signal specific to the mobile station are determined to be constant; and
   transmitting said data, said reference signal specific to the base station, and said reference signal specific to the mobile station allocated in said third domain.

2. The method according to claim 1, wherein ratios of the transmit power of the first domain having the data and of the transmit power of the first domain having the reference signal specific to the mobile station are made equal across a plurality of the second domains having the reference signal specific to the mobile station.

3. The method according to claim 2, wherein the transmit power of the first domain having the data and the transmit power of the first domain having the reference signal specific to the mobile station are made equal within the second domain having the reference signal specific to the mobile station.

4. The method according to claim 3, wherein said base station performs beamforming with respect to the mobile station.

5. The method according to claim 4, further comprising:
receiving the transmitted data; and
performing demodulation using ratios of the power of the reference signal specific to said base station, of the transmitted data, and of the reference signal specific to the mobile station.

6. The method according to claim 3, further comprising:
receiving the transmitted data; and
performing demodulation using ratios of the power of the reference signal specific to said base station, of the transmitted data, and of the reference signal specific to the mobile station.

7. The method according to claim 2, wherein said base station performs beamforming with respect to the mobile station.

8. The method according to claim 7, further comprising:
receiving the transmitted data; and
performing demodulation using ratios of the power of the reference signal specific to said base station, of the transmitted data, and of the reference signal specific to the mobile station.

9. The method according to claim 2, further comprising:
receiving the transmitted data; and
performing demodulation using ratios of the power of the reference signal specific to said base station, of the transmitted data, and of the reference signal specific to the mobile station.

10. The method according to claim 1, wherein the transmit power of the first domain having the data and the transmit power of the first domain having the reference signal specific to the mobile station are made equal within the second domain having the reference signal specific to the mobile station.

11. The method according to claim 10, wherein said base station performs beamforming with respect to the mobile station.

12. The method according to claim 11, further comprising:
receiving the transmitted data; and
performing demodulation using ratios of the power of the reference signal specific to said base station, of the transmitted data, and of the reference signal specific to the mobile station.

13. The method according to claim 10, further comprising:
receiving the transmitted data; and
performing demodulation using ratios of the power of the reference signal specific to said base station, of the transmitted data, and of the reference signal specific to the mobile station.

14. The method according to claim 1, wherein said base station performs beamforming with respect to the mobile station.

15. The method according to claim 14, further comprising:
receiving the transmitted data; and
performing demodulation using ratios of the power of the reference signal specific to said base station, of the transmitted data, and of the reference signal specific to the mobile station.

16. The method according to claim 1, further comprising:
receiving the transmitted data; and
performing demodulation using ratios of the power of the reference signal specific to said base station, of the transmitted data, and of the reference signal specific to the mobile station.

17. A base station comprising:
an allocation unit configured to:
allocate data, a reference signal specific to said base station, or a reference signal specific to a mobile station onto a first domain defined by frequency and time;
allocate a plurality of first domains in a frequency direction, said allocation of said plurality of first domains representing a second domain; and
allocate a plurality of second domains placed in a time direction, said allocation of said plurality of second domains representing a third domain, wherein the third domain has at least one second domain including more than one first domain having the reference signal specific to said base station while not having the reference signal specific to the mobile station, and a plurality of other second domains including more than one first domain having the reference signal specific to the mobile station while not having the reference signal specific to the base station, wherein the plurality of other second domains are arranged at an equal interval in said time direction;
a control unit configured to control transmittal powers for each of the first domains having the data or the reference signal specific to said base station or the reference signal specific to the mobile station in said third domain, wherein in said second domain:
the transmittal powers for the first domains having the reference signal specific to the base station are increased by decreasing a part of the transmittal powers for the first domains having the data, and
the transmittal powers for the first domains having the reference signal specific to the base station are different from the transmittal powers for the first domains having the reference signal specific to the mobile station, and in each of said at least one second domain and said plurality of other second domains, ratios of the transmit power between any of the first domains having the data and any of the first domains having the reference signal specific to the mobile station are determined to be constant; and
a transmission unit configured to transmit said data, said reference signal specific to the base station, and said reference signal specific to the mobile station allocated in said third domain.

18. The base station according to claim 17, wherein the ratios of the transmit power of the first domain having the data and of the transmit power of the first domain having the reference signal specific to the mobile station are made equal across a plurality of the second domains having the reference signal specific to the mobile station.

19. The base station according to claim 18, wherein the transmit power of the first domain having the data and the transmit power of the first domain having the reference signal specific to the mobile station are made equal within the second domain having the reference signal specific to the mobile station.

20. The base station according to claim 18, wherein said base station performs beamforming with respect to the mobile station.

21. The base station according to claim 17, wherein said base station performs beamforming with respect to the mobile station.

22. The base station according to claim 17, wherein the transmit power of the first domain having the data and the transmit power of the first domain having the reference signal specific to the mobile station are made equal within the second domain having the reference signal specific to the mobile station.

23. The base station according to claim 22, wherein said base station performs beamforming with respect to the mobile station.

24. A communication system comprising:
  at least one mobile station; and
  at least one base station configured to:
    allocate data, a reference signal specific to said base station, or a reference signal specific to the mobile station onto a first domain defined by frequency and time;
    allocate a plurality of first domains in a frequency direction, said allocation of said plurality of first domains representing a second domain; and
    allocate a plurality of second domains placed in a time direction, said allocation of said plurality of second domains representing a third domain, wherein the third domain has at least one second domain including more than one first domain having the reference signal specific to said base station while not having the reference signal specific to the mobile station, and a plurality of other second domains including more than one first domain having the reference signal specific to the mobile station while not having the reference signal specific to the base station, wherein the plurality of other second domains are arranged at an equal interval in said time direction;
    control transmittal powers for each of the first domains having the data or the reference signal specific to said base station or the reference signal specific to the mobile station in said third domain, wherein in said at least one second domain:
      the transmittal powers for the first domains having the reference signal specific to the base station are increased by decreasing a part of the transmittal powers for the first domains having the data, and
      the transmittal powers for the first domains having the reference signal specific to the base station are different from the transmittal powers for the first domains having the reference signal specific to the mobile station, and
    in each of said at least one second domain and said plurality of other second domains, ratios of the transmit power between any of the first domains having the data and any of the first domains having the reference signal specific to the mobile station are determined to be constant; and
    transmit said data, said reference signal specific to the base station, and said reference signal specific to the mobile station allocated in said third domain.

25. The communication system according to claim 24, wherein the ratios of the transmit power of the first domain having the data and of the transmit power of the first domain having the reference signal specific to the mobile station are made equal across a plurality of the second domains having the reference signal specific to the mobile station.

26. The communication system according to claim 25, wherein the transmit power of the first domain having the data and the transmit power of the first domain having the reference signal specific to the mobile station are made equal within the second domain having the reference signal specific to the mobile station.

27. The communication system according to claim 26, wherein said base station performs beamforming with respect to the mobile station.

28. The communication system according to claim 25, wherein said base station performs beamforming with respect to the mobile station.

29. The communication system according to claim 24, wherein the transmit power of the first domain having the data and the transmit power of the first domain having the reference signal specific to the mobile station are made equal within the second domain having the reference signal specific to the mobile station.

30. The communication system according to claim 29, wherein said base station performs beamforming with respect to the mobile station.

31. The communication system according to claim 24, wherein said base station performs beamforming with respect to the mobile station.

32. A mobile station comprising:
  a receiving unit, configured to receive transmitted data from a base station, wherein the transmitted data comprises data, a reference signal specific to said base station, and a reference signal specific to a mobile station;
  a processing unit, configured to perform demodulation using ratios of transmittal power of the reference signal specific to said base station, of the transmitted data, and of the reference signal specific to the mobile station, wherein the data, the reference signal specific to said base station, or the reference signal specific to the mobile station is mapped onto a first domain defined by frequency and time, and a plurality of first domains in a frequency direction represents a second domain; and
  a plurality of second domains placed in a time direction represents a third domain, wherein the third domain has at least one second domain including more than one first domain having the reference signal specific to said base station while not having the reference signal specific to the mobile station, and a plurality of other second domains including more than one first domain having the reference signal specific to the mobile station while not having the reference signal specific to the base station, wherein the plurality of other second domains are arranged at an equal interval in said time direction, and
  wherein the transmittal powers for each of the first domains having the data or the reference signal specific to the base station or the reference signal specific to the mobile station in said third domain are as follows in said at least one second domain:
    the transmittal powers for the first domains having the reference signal specific to the base station are increased by decreasing a part of the transmittal powers for the first domains having the data, and
    the transmittal powers for the first domains having the reference signal specific to the base station are different from the transmittal powers for the first domains having the reference signal specific to the mobile station, and in each of said at least one second domain and said plurality of other second domains, ratios of the transmit power between any of the first domains having the data and any of the first domains having the reference signal specific to the mobile station are determined to be constant.

33. The mobile station according to claim 32, wherein ratios of the transmit power of the first domain having the data and of the transmit power of the first domain having the reference signal specific to the mobile station are made equal across a plurality of the second domains having the reference signal specific to the mobile station.

* * * * *